(12) United States Patent
Andre et al.

(10) Patent No.: US 8,576,236 B2
(45) Date of Patent: Nov. 5, 2013

(54) MECHANISM FOR GRANTING CONTROLLED ACCESS TO A SHARED RESOURCE

(75) Inventors: Rodney C. Andre, Tyngsboro, MA (US); Rex E. McCrary, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 6 days.

(21) Appl. No.: 13/088,285

(22) Filed: Apr. 15, 2011

(65) Prior Publication Data

US 2011/0285731 A1 Nov. 24, 2011

Related U.S. Application Data

(63) Continuation of application No. 11/797,039, filed on Apr. 30, 2007, now Pat. No. 8,068,114.

(51) Int. Cl.
*G06F 15/167* (2006.01)
*G06F 15/16* (2006.01)
*G06F 15/80* (2006.01)
*G06F 13/14* (2006.01)
*G06F 13/18* (2006.01)

(52) U.S. Cl.
USPC ........... 345/541; 345/502; 345/505; 345/519; 345/535

(58) Field of Classification Search
USPC .......... 345/502, 505, 519, 535, 541; 700/2, 4, 700/5; 710/240
See application file for complete search history.

(56) References Cited

U.S. PATENT DOCUMENTS

| 3,848,234 | A | * | 11/1974 | MacDonald | 711/119 |
|---|---|---|---|---|---|
| 4,484,270 | A | * | 11/1984 | Quernemoen et al. | 710/37 |
| 5,117,352 | A | * | 5/1992 | Falek | 714/4.5 |
| 5,754,792 | A | * | 5/1998 | Shutoh et al. | 709/243 |
| 6,009,275 | A | * | 12/1999 | DeKoning et al. | 710/220 |
| 6,101,569 | A | * | 8/2000 | Miyamoto et al. | 710/200 |
| 6,199,179 | B1 | * | 3/2001 | Kauffman et al. | 714/26 |
| 6,229,752 | B1 | * | 5/2001 | Ayukawa et al. | 365/230.03 |
| 6,594,736 | B1 | * | 7/2003 | Parks | 711/151 |

(Continued)

OTHER PUBLICATIONS

Lamport, L., "A New Solution of Dijkstra's Concurrent Programming Problem," in *Communications of the ACM*, vol. 17, No. 8, 453-455 (Aug. 1974).

(Continued)

*Primary Examiner* — David T Welch
(74) *Attorney, Agent, or Firm* — Sterne, Kessler, Goldstein & Fox P.L.L.C.

(57) ABSTRACT

Disclosed are methods and systems for granting an application-specific integrated circuit (ASIC) in a multi-ASIC environment controlled access to a shared resource. A system includes a first ASIC, a second ASIC, and a shared memory that stores a shared resource and a data set partitioned into fields. The first ASIC writes data to a first subset of the fields and reads data from the fields. The first ASIC includes first logic that computes a first value based on the data read from the fields. The second ASIC writes data to a second subset of the fields and reads data from the fields. The second ASIC includes second logic that computes a second value based on the data read from the fields. Based on the first and second values respectively computed by the first and second logic, only one of the first and second ASICs gains access to the shared resource.

24 Claims, 15 Drawing Sheets

(56) References Cited

U.S. PATENT DOCUMENTS

| | | | |
|---|---|---|---|
| 6,687,818 B1* | 2/2004 | Svenkeson et al. | 713/2 |
| 7,065,614 B1* | 6/2006 | Vartti et al. | 711/141 |
| 7,584,316 B2* | 9/2009 | Oner | 710/263 |
| 7,750,915 B1* | 7/2010 | Acocella et al. | 345/541 |
| 2003/0002440 A1* | 1/2003 | Calvignac et al. | 370/229 |
| 2003/0051103 A1* | 3/2003 | Lardner et al. | 711/147 |
| 2003/0105796 A1* | 6/2003 | Sandri et al. | 709/104 |
| 2003/0126233 A1* | 7/2003 | Bryers et al. | 709/219 |
| 2004/0186988 A1* | 9/2004 | Polyudov | 713/100 |
| 2006/0161740 A1* | 7/2006 | Kottapalli et al. | 711/152 |
| 2008/0055321 A1* | 3/2008 | Koduri | 345/505 |
| 2009/0164752 A1* | 6/2009 | McConnell | 712/16 |

OTHER PUBLICATIONS

Peterson, G. L., "Myths about the Mutual Exclusion Problem," in *Information Processing Letters*, vol. 12, No. 3, 115-116, North Holland Publishing Company (Jun. 13, 1981).

* cited by examiner

FIG. 7

4 GPU Example

| DW 0 | Semaphore | | | |
|---|---|---|---|---|
| DW 1 | Last GPU Req ID of GPU 0123 | Last GPU Req ID of GPU 01 | GPU 1 Req | GPU 0 Req |
| DW 2 | | Last GPU Req ID of GPU 23 | GPU 3 Req | GPU 2 Req |
| | 31 | 24 23 | 16 15 | 8 7 0 |

8 GPU Example

| | Semaphore | | |
|---|---|---|---|
| DW 0 | | | |
| DW 1 | Last GPU Req ID of GPU0-3 | Last GPU Req ID of GPU01 | GPU 1 Req | GPU 0 Req |
| DW 2 | | Last GPU Req ID of GPU23 | GPU 3 Req | GPU 2 Req |
| DW 3 | Last GPU Req ID of GPU4567 | Last GPU Req ID of GPU45 | GPU 5 Req | GPU 4 Req |
| DW 4 | Last GPU Req ID of GPU0-8 | Last GPU Req ID of GPU67 | GPU 7 Req | GPU 6 Req |
| | 31    24 23 | 16 15 | 8 7 | 0 |

MECHANISM FOR GRANTING CONTROLLED ACCESS TO A SHARED RESOURCE

BACKGROUND OF THE INVENTION

1. Field of the Invention

The present invention is generally directed to computing operations performed in computer systems.

2. Background Art

In some computing environments, it is desirable to have multiple processing blocks or application-specific integrated circuits (ASICs) that can access a single shared resource, such as a shared memory. For example, some computer systems use multiple graphics processor units (GPUs) to improve graphics processing performance. In such computer systems, the GPUs may write to and/or read from a shared memory.

For example, FIG. 1 depicts a block diagram 100 illustrating a system that includes two GPUs—a GPU A 108 and a GPU B 110. Block diagram 100 also includes various software elements, such as an application 102 (e.g., a video game application), application programming interface (API) 104, and a driver 106, that execute on a host computer system and interact with GPU A 108 and/or GPU B 110 to perform graphics processing operations for output to a display 130. During the performance of these operations, GPU A 108 and GPU B 110 may read from and/or write to a local memory A 118 and a local memory B 128, respectively, in addition, GPU A 108 and GPU B 110 may also read from and/or write to a shared memory 105. Because GPU A 108 and GPU B 110 may each access shared memory 105, there must be a mechanism to insure that only one GPU accesses a particular location of shared memory 105 at a time. If such a mechanism is not included, the data in shared memory 105 could become corrupted.

A conventional mechanism that is used to restrict access to a shared resource in a multi-processing environment is a semaphore. A semaphore may be implemented as a single memory location that stores a count, which can be read/modified/written in an atomic operation. A semaphore may be used, for example, in a producer/consumer environment, to insure that the producer and the consumer do not access the same portion of the shared memory at the same time. A producer is a process that writes data to a shared memory and then updates the count, thereby indicating that data stored in the shared memory is ready for consumption. The consumer is a process that reads the data from the shared memory that is ready for consumption and then decrements the count stored in the semaphore.

The conventional semaphore mechanism could be implemented in a multiple GPU environment, but such an implementation would require a single point of control. For example, a single memory controller could be coupled to each GPU or one of the GPUs could be designed as a "master" GPU. Although such approaches would provide controlled access to a shared memory, such approaches require additional chip area because additional wires would be needed to couple the GPUs to the single memory controller or the "master" GPU. Furthermore, such approaches may result in timing lags because, if a first GPU in the multi-GPU environment stalls, the other GPUs coupled to the first GPU may also stall.

Given the foregoing, what is needed is a method and system that provide a mechanism for granting controlled access to a shared resource, without requiring a single point of control.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 7 depicts an example data structure that may be used to implement a request/acknowledgement mechanism for two GPUs in accordance with an embodiment of the present invention.

FIG. 10 depicts an example data structure that may be used to implement a request/acknowledgement mechanism for up to four GPUs in accordance with an embodiment of the present invention.

Figure 12A:
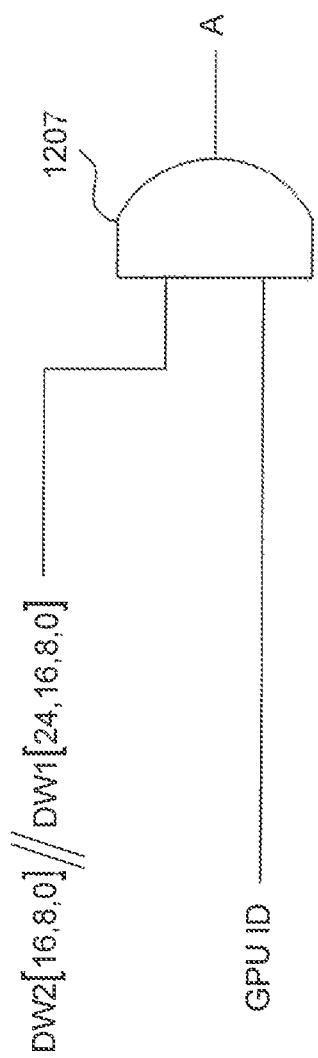
Figure 12B:
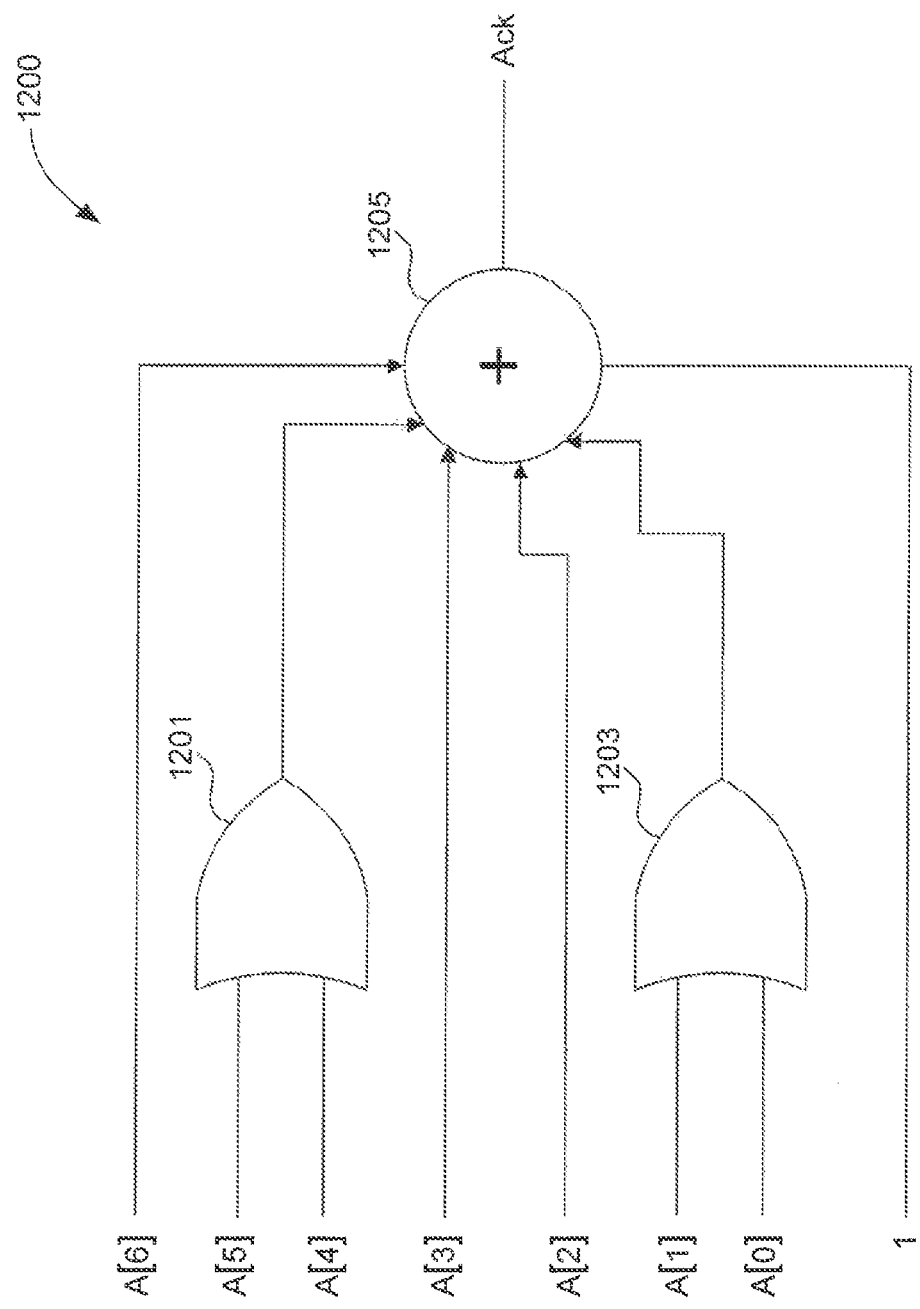

FIGS. 12A and 12B collectively depict an example hardware implementation for summing fields of the data structure of FIG. 10 to obtain a value that indicates whether a GPU in a four-GPU environment may have access to a shared resource.

FIG. 13 depicts an example data structure that may be used to implement the request/acknowledgement mechanism for up to eight GPUs in accordance with an embodiment of the present invention.

Figure 14:
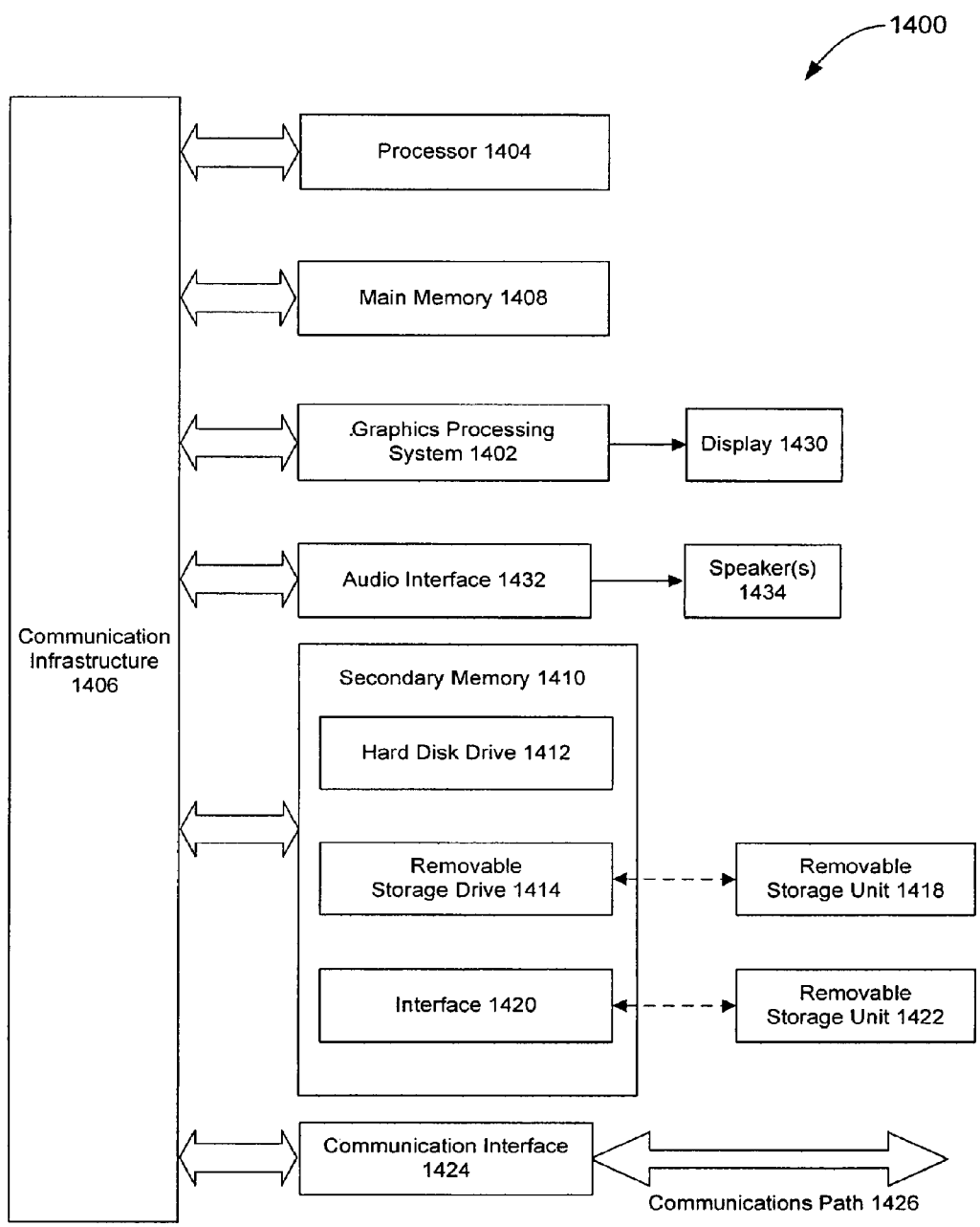

FIG. 14 depicts a block diagram of an example computer system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention provide mechanisms for granting an application-specific integrated circuit (ASIC) in a multi-ASIC environment controlled access to a shared resource, without requiring a single point of control. According to these embodiments, each ASIC is configured to write to a dedicated field or portion of a shared memory and read from the shared memory. Based on data read from the shared memory or memory locations within the shared memory, each individual ASIC is further configured to compute a value. An individual ASIC uses the value that it computes to determine whether it may access the shared resource. In this way, the individual ASICs respectively determine whether they may access the shared resource. Because the ASICs do not have to communicate with a single point of control to determine whether they may access the shared resource, embodiments of the present invention can be implemented using smaller chip area compared to implementations that require a single point of control. In addition, embodiments of the present invention can be implemented without a timing lag that may be associated with implementations that require a single point of control.

A person skilled in the relevant art(s) will appreciate that the embodiments described herein are applicable to any ASICs that are included in a multi-ASIC environment, such as graphics processing units (GPUs) included in a multi-GPU environment, central processing units (CPUs) included in a multi-CPU environment, or a combination of GPU(s) and CPU(s) included in a multi-GPU/CPU environment. It is to be appreciated that such multi-ASIC/CPU/GPU embodiments, and combinations thereof, are contemplated within the spirit and scope of the present invention. For illustrative purposes, and not limitation, embodiments of the present invention are described herein in terms of GPUs included in multi-GPU environments.

Figure 2:
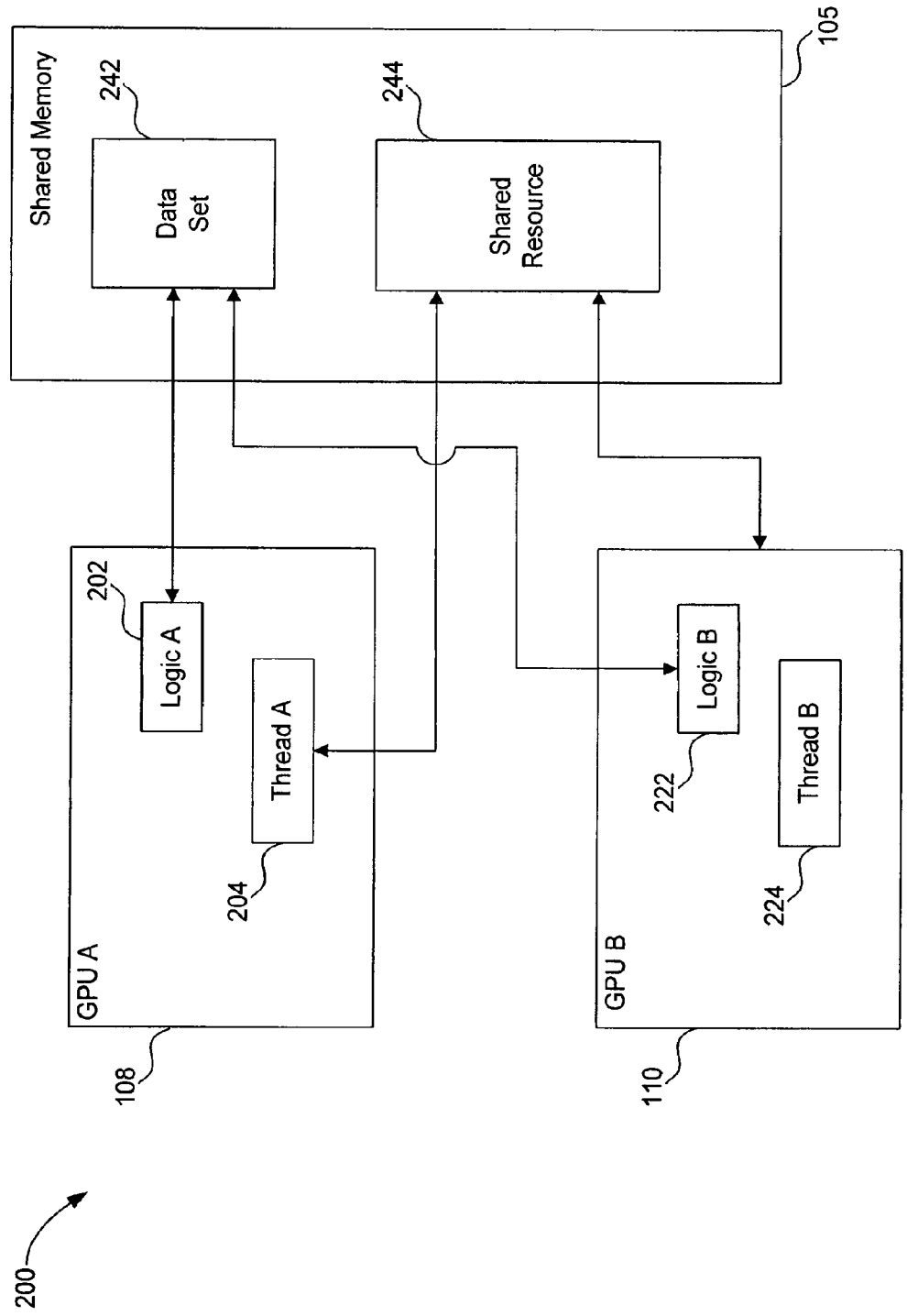
FIG. 2 depicts a block diagram illustrating a plurality of GPUs configured to access a shared resource in accordance with an embodiment of the present invention.
Figure 3:
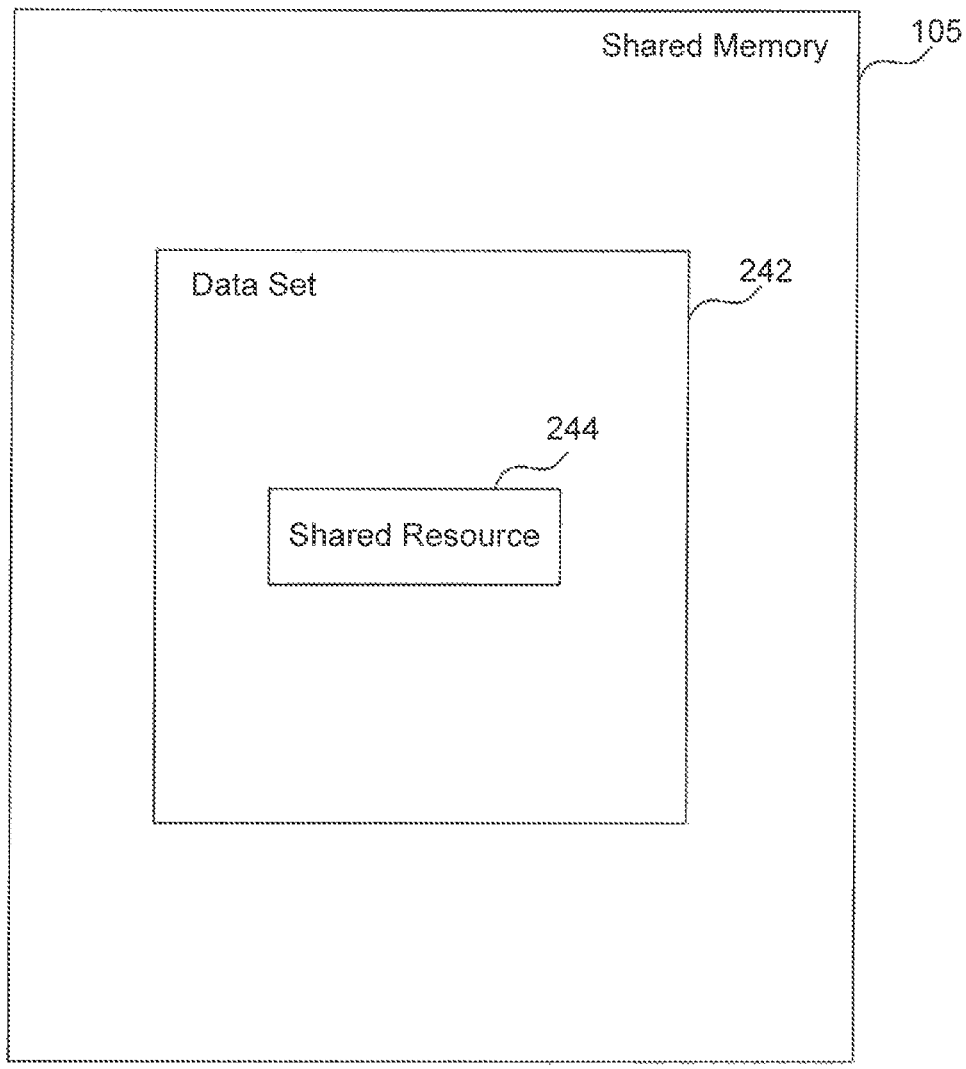
FIG. 3 depicts a block diagram illustrating an example configuration of a shared memory in accordance with an embodiment of the present invention.

For example, FIG. 2 depicts a block diagram of a system 200 illustrating a plurality of GPUs configured to access a shared resource in accordance with an embodiment of the present invention. As shown in FIG. 2, system 200 includes a GPU A 108, a GPU B 110, and a shared memory 105. GPU A 108 includes logic A 202 and executes a thread A 204. Similarly, GPU B 110 includes logic B 222 and executes a thread B 224. Shared memory 105 includes a data set 242 and a shared resource 244. In an embodiment, shared resource 244 may be included in data set 242 as shown in FIG. 3. The operation of system 200 is described below.

Logic A 202 and logic B 222 respectively determine whether GPU A 108 and GPU B 110 may access shared resource 244 based on data read from data set 242. In particular, logic A 202 is configured to write to a first set of dedicated fields or portions of data set 242 and read from data set 242. Logic A 202 is further configured to compute a first value based on the data it reads from data set 242. Responsive to this first value, thread A 204 executing on GPU A 108 either accesses shared resource 244 or does not access shared resource 244. Similarly, logic B 222 writes to a second set of dedicated fields or portions of data set 242 and reads from data set 242. Logic B 222 is further configured to compute a second value based on the data it reads from data set 242. Responsive to this second value, thread B 224 executing on GPU B 110 either accesses shared resource 244 or does not access shared resource 244. As described in more detail herein, the mechanism that logic A 204 and logic B 224 respectively use to compute the first and second values ensures that thread A 204 and thread B 224 do not simultaneously access the same portion of shared resource 244 at the same time.

In one embodiment, logic A 204 and logic B 224 use a semaphore mechanism to determine controlled access to shared resource 244. In this embodiment, a single memory location in shared memory 105 is dedicated to each GPU in system 200. The cumulative memory represents a "single logical semaphore." To determine the logical semaphore value, the dedicated memory locations are read and added together. The logical semaphore value is used to determine whether thread A 204 or thread B 224 may access shared resource 244.

In another embodiment, logic A 204 and logic B 224 use a request/acknowledgement mechanism. In this embodiment, GPU A 108 and GPU B 110 are each configured to write to data set 242 to set respective dedicated bits that indicate a request for access to shared resource 244. GPU A 108 and GPU B 110 can each read data set 242. In response to a request for access by GPU A 108, logic A 204 computes a first acknowledgement value based on the data it reads from data set 242. Similarly, in response to a request for access by GPU B 110, logic B 224 computes a second acknowledgement value based on the data it reads from data set 242. Based on the first and second acknowledgement values, only one of GPU A 108 and GPU B 110 is granted access to a given portion of shared resource 244 at a given time.

Each of the foregoing embodiments is described in more detail below.

II. An Example Multi-Summed Semaphore in Accordance with an Embodiment of the Present Invention As mentioned above, an embodiment of the present invention uses a semaphore mechanism to determine whether a GPU in a multi-GPU environment may access a shared resource. First, an overview of this semaphore mechanism is presented. Second, an example is described in which this semaphore mechanism is used for communicating the frame status of streaming video. Third, example computer code implementing this semaphore mechanism is presented. Finally, example activity of two GPUs in a multi-GPU environment is presented.

A. Overview of Multi-Summed Semaphores

A semaphore mechanism can be used to maintain data integrity across multiple client/thread accesses. In a conventional semaphore mechanism, a semaphore is a single memory location that can be read/modified/written in an atomic operation. A "producer" sends a signal command that increments a value stored at the memory location. For example, if the value stored at the memory location is 0x00000001, a signal command from the "producer" increments the valued stored at the memory location to 0x00000002. A "consumer" sends a wait command that stalls (i.e. "blocks") if the value is equal to 0 and decrements the value if the value is greater than 0. For example, if the value is 0x00000000, a wait command from the "consumer" causes the consumer to block; whereas if the value is 0x00000001, a wait command from the "consumer" decrements the value to 0x00000000. Conventionally, the atomic operation is handled by a single hardware entity, such as a single uninterruptible command or a shared memory controller.

The conventional semaphore mechanism could be used in a multi-GPU environment, but this would require a single shared memory controller. As mentioned above, using a single shared memory controller is not desired because it can cause time delay's and requires additional chip area. If there is not a single shared memory controller, the conventional semaphore mechanism cannot be used in a multi-GPU environment. As described in more detail below, an embodiment of the present invention expands the conventional semaphore mechanism to handle a plurality of logically atomic clients, such as a plurality of GPUs, but does not require a single shared memory controller.

In this embodiment, a single memory location is dedicated to each GPU in a multi-GPU environment. The cumulative memory of all the dedicated memory locations represents a "single logical semaphore." For example, in a system that uses a 32 bit semaphore and includes two GPUs, the single logical semaphore would require 64 bits of memory. In this example, each GPU in the two GPU system would read/modify/write to a dedicated 32 bits of the 64 bits.

To determine a logical semaphore value corresponding to the single logical semaphore, a GPU in the multi-GPU environment reads all the dedicated memory locations and adds the values stored in each of the dedicated memory locations. The sum of all the values corresponds to the single logical semaphore value. For example, the value corresponding to a first GPU in a two-GPU environment may be 0xFFFFFFF1 and the memory location corresponding to a second GPU in the two-GPU environment may be 0x00000001. In this example, the single logical semaphore would be 0xFFFFFFF2 (equal to 0xFFFFFFF1 plus 0x00000001).

According to an embodiment, there is no need to reset individual dedicated semaphore memory locations to avoid "flipping back to 0" because each dedicated semaphore is treated as a signed value. For example, in a two-GPU environment in which one GPU acts exclusively as a producer and the other GPU acts exclusively as a consumer, the value stored at the memory location of the producer may be 0xFFFFFFFF and the value stored at the memory location of the consumer may be 0x00000001. In this example, the summed state of the producer and consumer would be 0x00000000—i.e., the number of signal commands is equal to the number of wait commands. A new signal command from the producer would increment the value stored at the memory location of the producer to 0x00000000 (equal to 0xFFFFFFFF plus 0x00000001). Thus, the summed state would be 0x00000001, which indicates that the logical semaphore is ready for a consumer request.

The multi-summed semaphore embodiment is based on several underlying concepts. First, each individual semaphore always correctly reflects the signal-versus-wait count for a given GPU in a multi-GPU environment. Although it may appear to other GPUs that this count "bounces" as a pending wait command is attempting to become unblocked, the count is still accurate. Furthermore, the sum of all semaphores is always less than or equal to the total number of outstanding signal commands. If the sum of all the semaphores is less than the total number of outstanding signal commands, then there may be a "false" block by a consumer, but it will not result in the integrity of data being compromised. In addition, although two wait commands competing for the same signal command can starve each other, such a starvation condition will never occur if the total number of signal commands is greater than or equal to the total number of wait commands.

In an embodiment, a dedicated memory location is pre-decremented on a wait command before summing the other dedicated memory locations. In this embodiment, a consumer only blocks if the summed value is negative. If the consumer does block, the dedicated memory location is incremented to compensate for the pre-decrement.

Figure 4:
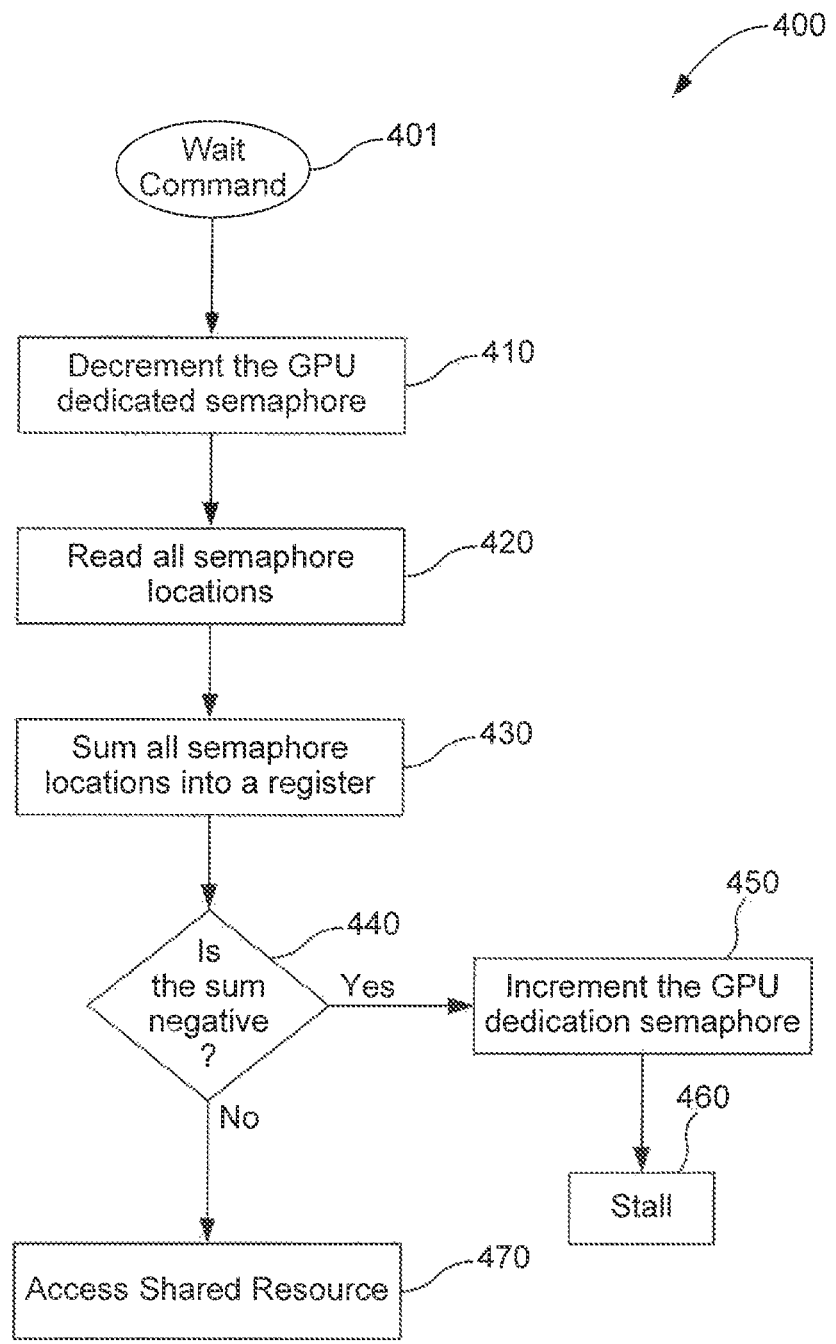
FIG. 4 depicts a flowchart illustrating an example method that a GPU executes in response to a wait command in accordance with an embodiment of the present invention.

For example, FIG. 4 depicts a flowchart illustrating a method 400 for responding to a wait command in accordance with an embodiment of the present invention. As shown in FIG. 4, method 400 begins with the issuance of a wait command 401. Wait command 401 may be issued by a consumer embodied in a first GPU.

In a step 410, the dedicated semaphore for the first GPU is decremented. For example, if the dedicated semaphore for the first GPU is 0x00000003, then it will be decremented to 0x00000002 in response to wait command 401.

In a step 420, all the semaphore locations are read. Then, in a step 430, all the semaphores are summed into a register that is the same size as the individual semaphores. For example, the semaphores may be summed into a 32-bit register. Because there is data contention from different GPUs, the summed value will be less than or equal to the actual "accumulated signal requests" (including this wait) across all GPUs.

In a step 440, it is determined whether the summed value is negative. The summed value is determined to be negative if the highest bit is set. If the summed value is negative, then the dedicated semaphore corresponding to the first GPU is incremented to compensate for the pre-decrement, as shown in step 450. Thereafter, the first GPU will stall, as shown in step 460.

If however, the summed value is non-negative, then the first GPU can access the shared resource, as shown in step 470.

Figure 5:
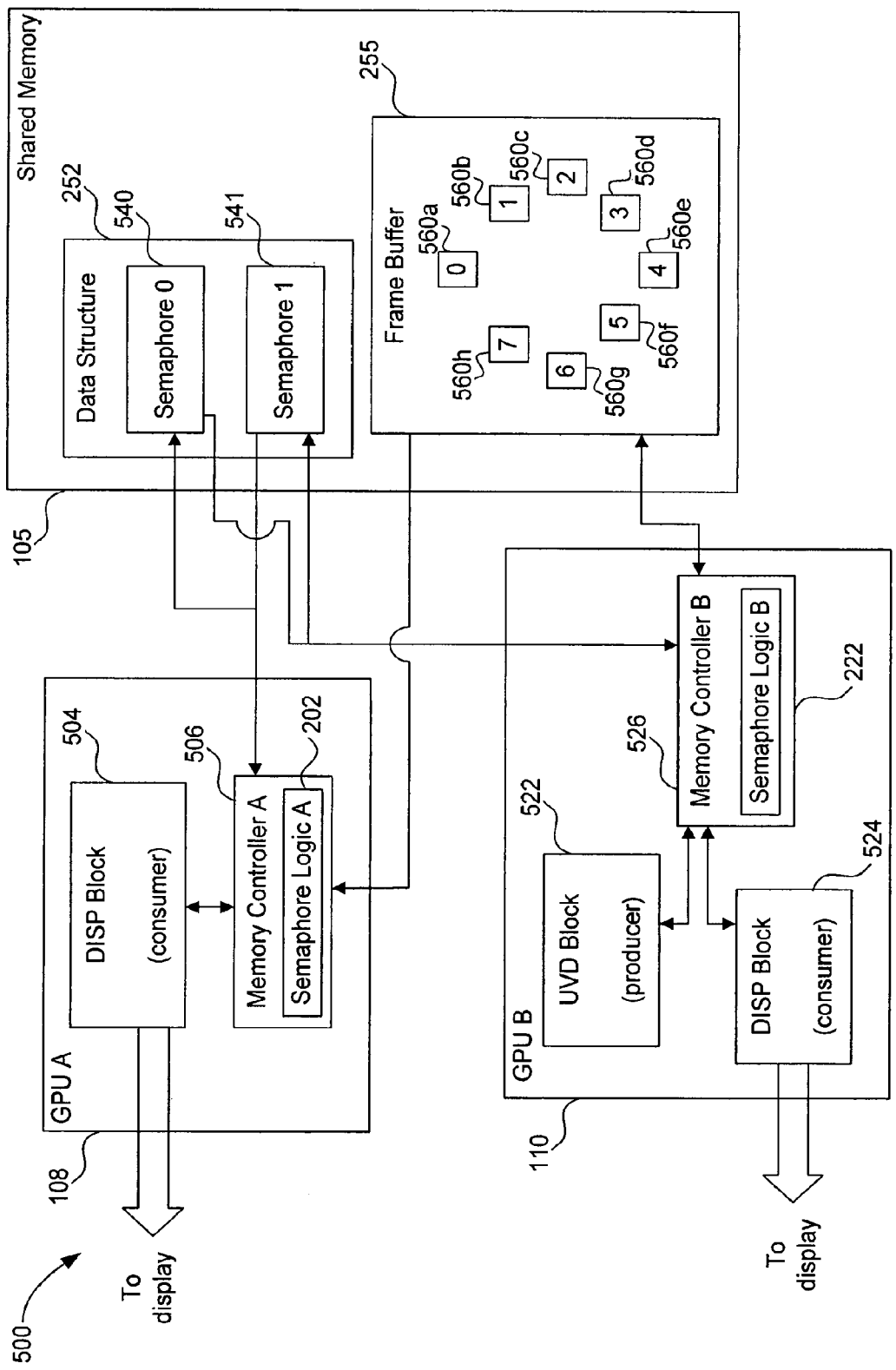
FIG. 5 depicts a block diagram illustrating a multi-GPU based semaphore used to communicate frame status of streaming video.

B. Example Multi-Summed Semaphore for Communicating the Frame Status of Streaming Video FIG. 5 depicts a block diagram of a system 500 including a plurality of GPUs that use a multi-summed semaphore mechanism to communicate, for example, a frame status of streaming video. System 500 includes shared memory 105, GPU A 108, and GPU B 110. In the embodiment illustrated in FIG. 5, GPU A 108 includes a display (DISP) block 504 that reads frames from a frame buffer 255 included in shared memory 105, and GPU B 110 includes a DISP block 524 that reads frames from frame buffer 255 and a universal video decoder (UVD) block 522 that writes frames to frame buffer 255. Data structure 252 includes a logical semaphore that grants both GPU A 108 and GPU B 110 controlled access to frame buffer 255. In this way, frames 560a-h stored in frame buffer 255 are not corrupted. Each of the elements included in system 500 are described in more detail below.

Shared memory 105 includes data structure 242 and a frame buffer 244. Data structure 242 includes a first semaphore 540 dedicated to GPU A 108 and a second semaphore 541 dedicated to GPU B 110. Frame buffer 244 comprises a ring buffer that may store a plurality of frames of streaming video data—including frame (0) 560a, frame (1) 560b, frame (2) 560c, frame (3) 560d, frame (4) 560e, frame (5) 560f, frame (6) 560g, and frame (7) 560h.

GPU A 108 further includes a memory controller A 506. DISP block 504 is coupled to memory controller A 506, which also includes semaphore logic A 202. Memory controller A 506 is in turn coupled to data structure 252 and frame buffer 255 of shared memory 105. Based on the coupling between memory controller A 506 and shared memory 105, GPU A 108 may read/modify/write first semaphore 540 and may read second semaphore 541 of data structure 252. In other words, first semaphore 540 is stored at a dedicated memory location corresponding to GPU A 108. In response to a request for access to frame buffer 255 by GPU A 108, memory controller A 506 reads first semaphore 540 and second semaphore 541 and logic A 202 sums the contents thereof to compute a logical semaphore value. Based on this logical semaphore, a determination is made as to whether DISP block 504 is permitted to read frames 560 of frame buffer 255, as described in more detail below.

GPU B 110 further includes a memory controller B 526. DISP block 524 and UVD block 522 are each coupled to memory controller B 526, which also includes logic B 222. Memory controller B 526 is in turn coupled to data structure 252 and frame buffer 255 of shared memory 105. Based on the coupling between memory controller B 526 and shared memory 105, GPU B 110 may read/modify/write second semaphore 541 and may read first semaphore 540 of data structure 252. In other words, second semaphore 541 is stored at a dedicated memory location corresponding to GPU B 110. In response to a request for access to frame buffer 255 by GPU B 110, memory controller B 526 reads first semaphore 540 and second semaphore 541 and logic B 222 sums the contents thereof to compute a logical semaphore value. Based on this logical semaphore, a determination is made as to whether DISP block 524 is permitted to read frames 560 from frame buffer 255. UVD block 522 writes frames 560 to frame buffer 255, as described in more detail below.

The operation of system 500 is now described. Generally speaking, UVD block 522 of GPU B 110 produces frames of video that are consumed by DISP block 524 of GPU B 110 and DISP block 504 of GPU A 108. That is, the function of UVD block 522 is to continually store frames of video in frame buffer 255 and the function of DISP block 524 and DISP block 504 is to perform graphics processing operations on the frames of video in frame buffer 255. For example, UVD block 522 may store frames of video corresponding to a news broadcast in frame buffer 255, DISP block 524 may provide a first type of graphics overlay on this video (such as a stream of closing stock prices that appear at the bottom of the video), and DISP block 504 may provide a second type of graphics overlay on this video (such as the current time). Because there are two consumers in the example of FIG. 5—namely, DISP block 504 and DISP block 524—UVD block 522 writes two copies of each frame to frame buffer 255. DISP block 504 consumes one copy of each frame and DISP block 524 consumes the other.

UVD block 522 sends signal commands through memory controller B 526 to second semaphore 541 to indicate that frames in frame buffer 255 are ready for consumption. UVD block 522 writes frames to frame buffer 255 in a circular manner, such that a first frame of video is written to frame (0) 560*a*, a second frame of video is written to frame (1) 560*b*, a third frame of video is written to frame (2) 560*c*, and so on until it writes an eighth frame of video to frame (7) 560*h*. After writing to frame (7) 560*h*, UVD block 522 writes the next frame to frame (0) 560*a*, and then proceeds to write to subsequent frames as set forth above. For example, suppose first semaphore 540 is initially 0x00000000 and second semaphore 541 is initially 0x00000000. For a first frame of video, UVD block 522 writes one copy of this frame to frame (0) 560*a* and another copy of this frame to frame (1) 560*b*. In addition, UVD block 522 sends two signal commands through memory controller B 526 to second semaphore 541. The two signal commands increment a count in second semaphore 541 by two, thereby indicating that two frames in frame buffer 255 are ready for consumption. Thus, the two signal commands will cause second semaphore 541 to be incremented from 0x00000000 to 0x00000002. For each subsequent frame of video, UVD block 522 writes to frame buffer 255 and increments the count in second semaphore 541 in a similar manner.

DISP block 504 determines whether there are frames in frame buffer 255 that are ready for consumption based on data in data structure 252. DISP block 504 sends a wait command through memory controller A 506 causing first semaphore 540 to be decremented by one. From the example above, decrementing first semaphore 540 by one will cause first semaphore 540 to be 0xFFFFFFFF. In addition, the wait command causes memory controller A 506 to read first semaphore 540 and second semaphore 541, and logic A 202 to sum these semaphores into a register (such as a 32-bit register), thereby resulting in a logical semaphore value. From the example above, memory controller A 506 reads 0xFFFFFFFF from first semaphore 540 and 0x00000002 from second semaphore 541. Thus, the logical semaphore value computed by logic A 202 will be 0x00000001 (equal to 0xFFFFFFFF plus 0x00000002). Because the logical semaphore is non-negative, DISP block 504 may proceed to consume a frame in frame buffer 255.

In a similar manner to DISP block 504, DISP block 524 determines whether there are frames in frame buffer 255 that are ready for consumption based on data in data structure 252. From the example above, a wait command for GPU B 110 will cause second semaphore 541 to be decremented by one, thereby resulting in a value of 0x00000001. In addition, the wait command causes memory controller B 526 to read first semaphore 540 and second semaphore 541, and logic B 222 to sum these semaphores into a register (such as a 32-bit register), thereby resulting in a logical semaphore value. From the example above, memory controller B 526 reads 0xFFFFFFFF from first semaphore 540 and 0x00000001 from second semaphore 541. Thus, the logical semaphore value computed by logic B 222 will be 0x00000000 (equal to 0xFFFFFFFF plus 0x00000001). Because the logical semaphore value is non-negative, DISP block 524 may proceed to consume a frame in frame buffer 255.

Subsequent frames are written by UVD block 522 and consumed by DISP block 504 and DISP block 524 in a similar manner to that described above, as will be apparent to a person skilled in the relevant art(s) from reading the description contained herein.

C. Example Computer Code to Implement Multi-Summed Semaphores

The following describes this solution (treating the semaphore storage as an array of semaphores):

```
// producer generated signal
//
// pulSemBase is pointer to a sem array of size = Number of GPUs
// ulGPUIdx is a 0 based value that represents the calling GPU
//
signal(uint32 *pulSemBase, uint32 ulGPUIdx)
{
    uint32 ulTempReg;
//////////////
    // Atomic BEGIN
    // Read/Modify/Write increment
        ulTempReg = pulSemBase[ulGPUIdx];
```

-continued

```
        ulTempReg += 1;
        pulSemBase[ulGPUIdx] = ulTempReg;
        // Atomic END
////////////////
}
/////////////////////
// consumer generated wait
//
// pulSemBase is pointer to a sem array of size = Number of GPUs
// ulGPUIdx is a 0 based value that represents the calling GPU
// ulGPUEnableMask represents the "enabled" GPUs (ex 0x3 for 2 GPUs)
//
wait(uint32 *pulSemBase, uint32 ulGPUIdx, uint32 ulGPUEnableMask)
{
    uint32 ulTempReg;
    uint32 ulDedicatedSemReg;
    uint32 ulTotalSemReg;
    ulTotalSemReg = 0x80000000;
    while ((ulTotalSemReg & 0x80000000) != 0)
    {
        uint32 ulI; // Real backing memory for HW is not needed
        ////////////////
        // Atomic BEGIN
        // decrement (before a check)
        ulDedicatedSemReg = pulSemBase[ulGPUIdx];
        ulDedicatedSemReg -= 1;
        pulSemBase[ulGPUIdx] = ulDedicatedSemReg;
        // Add up all the dedicated semaphores.
        ulTotalSemReg = ulDedicatedSemReg;
        // Note, this loop can be "unrolled" for real HW based on the
        // total number of supported GPUs, and we may not need storage
        // for ulI.
        for (ulI=0; ulI<MAX_GPUS; ++ulI)
        {
            if (((ulGPUEnableMask & (1<<ulI)) != 0) &&
                (ulGPUIdx != ulI))
            {
                ulTempReg = pulSemBase[ulI];
                ulTotalSemReg += ulTempReg;
            }
        }
        // Check to see if we are ok (not Negative). Note, a "negative"
        // number is one that has bit 31 set.
        if ((ulTotalSemReg & 0x80000000) != 0)
        {
            // OK, in a wait state. Increment the dedicated semaphore to
            // make up for the "pre-check," then decrement
            ulDedicatedSemReg += 1;
            pulSemBase[ulGPUIdx] = ulDedicatedSemReg;
        }
        // Atomic END
        ////////////////
        // Are we in a wait state?
        if ((ulTotalSemReg & 0x80000000) != 0)
        {
            // Let's sleep given we are in a wait state.
            sleep( );
        }
    }
}
/////////////////////
// query current semaphore value (for the concept of debug purposes only)
//
uint32 query(uint32 *pulSemBase, uint32 ulGPUEnableMask)
{
    uint32 ulTempReg;
    uint32 ulTotalSemReg;
    uint32 ulI;
    // Note, this does not require atomic
    // interaction.
    ulTempReg = 0;
    ulTotalSemReg = 0;
    for (ulI=0; ulI<MAX_GPUS; ++ulI)
    {
        if ((ulGPUEnableMask & (1<<ulI)) != 0)
        {
            ulTempReg = pulSemBase[ulI];
            ulTotalSemReg += ulTempReg;
        }
    }
    return ulTotalSemReg;
}
```

D. Example Activity of Two GPUs

Provided below are example activity of a first GPU (GPU0) and second GPU (GPU1) in a two-GPU environment.

| // First, ideal/clean "case" (4 producer signals; 4 consumer waits) | |
|---|---|
| Initial state    | GPU0=0x00000000 GPU1=0x00000000 |
| GPU0-signal      | GPU0=0x00000001 GPU1=0x00000000 |
| GPU0-signal      | GPU0=0x00000002 GPU1=0x00000000 |
| GPU1-signal      | GPU0=0x00000002 GPU1=0x00000001 |
| GPU1-wait[dec]   | GPU0=0x00000002 GPU1=0x00000000 |
| GPU1-wait[sum0]  | TOTAL=0x00000002 |
| GPU1-wait[sum1]  | TOTAL=0x00000002 (OK) |
| GPU0-wait[dec]   | GPU0=0x00000001 GPU1=0x00000000 |
| GPU0-wait[sum0]  | TOTAL=0x00000001 |
| GPU0-wait[sum1]  | TOTAL=0x00000001 (OK) |
| GPU1-wait[dec]   | GPU0=0x00000001 GPU1=0xFFFFFFFF |
| GPU1-wait[sum0]  | TOTAL=0x00000000 |
| GPU1-wait[sum1]  | TOTAL=0x00000000 (OK) |
| GPU1-wait[dec]   | GPU0=0x00000001 GPU1=0xFFFFFFFE |
| GPU1-wait[sum0]  | TOTAL=0x00000001 |
| GPU1-wait[sum1]  | TOTAL=0xFFFFFFFF (BLOCK) |
| GPU1-wait[inc]   | GPU0=0x00000001 GPU1=0xFFFFFFFF |
| GPU0-signal      | GPU0=0x00000002 GPU1=0xFFFFFFFF |
| GPU1-wait[dec]   | GPU0=0x00000002 GPU1=0xFFFFFFFE |
| GPU1-wait[sum0]  | TOTAL=0x00000002 |
| GPU1-wait[sum1]  | TOTAL=0x00000000 (OK) |
| GPU1-wait[inc]   | GPU0=0x00000001 GPU1=0xFFFFFFFF |
| // An example of "timing" issues (2 producer signals; 2 consumer waits) | |
| Initial state    | GPU0=0x00000000 GPU1=0x00000000 |
| GPU1-signal      | GPU0=0x00000001 GPU1=0x00000000 |
| GPU1-wait[dec]   | GPU0=0x00000001 GPU1=0xFFFFFFFF |
| GPU1-wait[sum0]  | TOTAL=0x00000001 |
| GPU0-wait[dec]   | GPU0=0x00000000 GPU1=0xFFFFFFFF |
| GPU0-wait[sum0]  | TOTAL=0x00000000 |
| GPU0-wait[sum1]  | TOTAL=0xFFFFFFFF (BLOCK) |
| GPU1-wait[sum1]  | TOTAL=0x00000000 (OK) |
| GPU0-wait[inc]   | GPU0=0x00000001 GPU1=0xFFFFFFFF |
| GPU0-wait[dec]   | GPU0=0x00000000 GPU1=0xFFFFFFFF |
| GPU0-wait[sum0]  | TOTAL=0x00000000 |
| GPU0-signal      | GPU0=0x00000001 GPU1=0xFFFFFFFF |
| GPU0-wait[sum1]  | TOTAL=0xFFFFFFFF (BLOCK) |
| GPU0-wait[inc]   | GPU0=0x00000002 GPU1=0xFFFFFFFF |
| GPU0-wait[dec]   | GPU0=0x00000001 GPU1=0xFFFFFFFF |
| GPU0-wait[sum0]  | TOTAL=0x00000001 |
| GPU0-wait[sum1]  | TOTAL=0x00000000 (OK) |
| // Over time, an individual semaphore is expected to flip. | |
| // Here is some more "timing" issues after flip(s) (2 producer signals; 2 consumer waits) | |
| Initial state    | GPU0=0x80000002 GPU1=0x7FFFFFFE |
| GPU0-wait[dec]   | GPU0=0x80000001 GPU1=0x7FFFFFFE |
| GPU1-signal      | GPU0=0x80000001 GPU1=0x7FFFFFFF |
| GPU1-signal      | GPU0=0x80000001 GPU1=0x80000000 |
| GPU0-wait[sum0]  | TOTAL=0x80000001 |
| GPU1-wait[dec]   | GPU0=0x80000001 GPU1=0x7FFFFFFF |
| GPU0-wait[sum1]  | TOTAL=0x00000000 (OK) |
| // Possible "timing starve" of 2 waits for 1 signal | |
| GPU0-wait[dec]   | GPU0=0x80000000 GPU1=0x7FFFFFFF |
| GPU1-wait[sum0]  | TOTAL=0x80000000 |
| GPU1-wait[sum1]  | TOTAL=0xFFFFFFFF (BLOCK) |
| GPU0-wait[sum0]  | TOTAL=0x80000000 |
| GPU0-wait[sum1]  | TOTAL=0xFFFFFFFF (BLOCK) |
| GPU1-wait[inc]   | GPU0=0x80000000 GPU1=0x80000000 |
| GPU1-wait[dec]   | GPU0=0x80000000 GPU1=0x7FFFFFFF |
| GPU1-wait[sum0]  | TOTAL=0x80000000 |
| GPU1-wait[sum1]  | TOTAL=0xFFFFFFFF (BLOCK) |

```
        ulTotalSemReg += ulTempReg;
        }
    }
    return ulTotalSemReg;
}
```

-continued

| | |
|---|---|
| GPU0-wait[inc] | GPU0=0x80000001 GPU1=0x7FFFFFFF |
| GPU0-wait[dec] | GPU0=0x80000000 GPU1=0x7FFFFFFF |
| GPU0-wait[sum0] | TOTAL=0x80000000 |
| GPU0-wait[sum1] | TOTAL=0xFFFFFFFF (BLOCK) |
| | // Possible "timing resolve of starve" |
| GPU1-wait[inc] | GPU0=0x80000000 GPU1=0x80000000 |
| GPU0-wait[inc] | GPU0=0x80000001 GPU1=0x80000000 |
| GPU1-wait[dec] | GPU0=0x80000000 GPU1=0x80000000 |
| GPU1-wait[sum0] | TOTAL=0x80000000 |
| GPU1-wait[sum1] | TOTAL=0x00000000 (OK) |
| | // This is a legit wait for signal logic |
| GPU0-wait[dec] | GPU0=0x80000000 GPU1=0x7FFFFFFF |
| GPU0-wait[sum0] | TOTAL=0x80000000 |
| GPU0-wait[sum1] | TOTAL=0xFFFFFFFF (BLOCK) |
| GPU0-wait[inc] | GPU0=0x80000000 GPU1=0x80000000 |
| GPU0-wait[dec] | GPU0=0x80000000 GPU1=0x7FFFFFFF |
| GPU0-wait[sum0] | TOTAL=0x80000000 |
| GPU0-wait[sum1] | TOTAL=0xFFFFFFFF (BLOCK) |
| GPU0-wait[inc] | GPU0=0x80000000 GPU1=0x80000000 |
| | // And resolved with final signal (by either GPU) |
| GPU0-signal | GPU0=0x80000001 GPU1=0x80000000 |
| GPU0-wait[dec] | GPU0=0x80000001 GPU1=0x7FFFFFFF |
| GPU0-wait[sum0] | TOTAL=0x80000001 |
| GPU0-wait[sum1] | TOTAL=0x00000000 (OK) |

III. A Multi-GPU Request/Acknowledgement Mechanism in Accordance with an Embodiment of the Present Invention As mentioned above with respect to FIG. 2, an embodiment of the present invention uses a request/acknowledgement mechanism to determine whether a GPU in a multi-GPU environment may access a shared resource. First, an overview of this request/acknowledgement mechanism is presented. Then, this mechanism is described in embodiments involving two GPUs, four GPUs and eight GPUs.

A. Overview of Multi-GPU Request/Acknowledgement Mechanism

Figure 6:
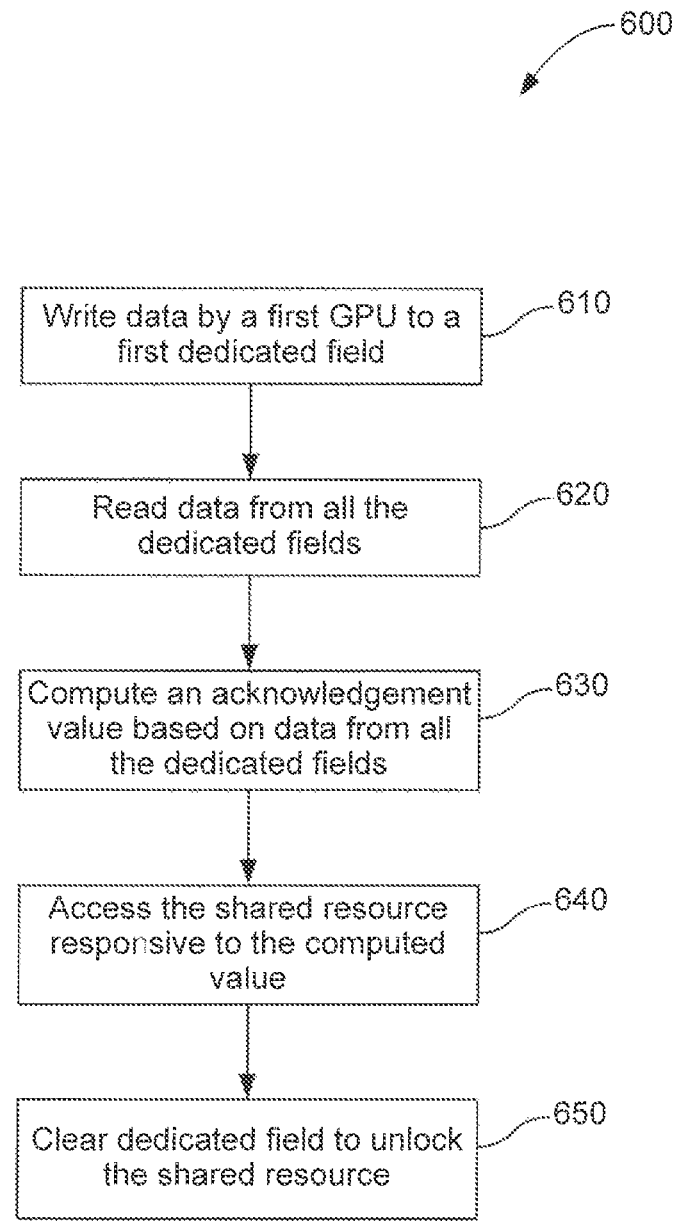
FIG. 6 depicts a flowchart illustrating a method for implementing a request/acknowledgement mechanism to allow a GPU in a multi-GPU environment controlled access to a shared resource in accordance with an embodiment of the present invention.

FIG. 6 depicts a flowchart illustrating a method 600 for implementing a request/acknowledgement mechanism to allow a GPU in a multi-GPU environment controlled access to a shared resource in accordance with an embodiment of the present invention. Each GPU in the multi-GPU environment can independently execute method 600 to determine whether it may access the shared resource. In this way, only one GPU in the multi-GPU environment will be granted access to the shared resource at any one time. For example, GPU A 108 of FIG. 2 may execute method 600 to determine whether it may access shared resource 244 and GPU B 110 of FIG. 2 may execute method 600 to determine whether it may access shared resource 244. In this example, only one of GPU A 108 and GPU B 110 would be granted access to shared resource 244 after executing method 600. Method 600 is described in more detail below.

Method 600 begins at a step 610 in which at least one GPU in the multi-GPU environment writes data to a dedicated field or portion of a data set. For example, the data set may be data set 242 depicted in FIG. 2. The organization of data set 242 is dependent on the number of GPUs included in the multi-GPU environment, as described in more detail below with respect to FIGS. 7, 10, and 13. In an embodiment, a first GPU sets a bit in the data set to indicate that the first GPU is requesting access to the shared resource.

In a step 620, at least one GPU reads data from all the dedicated fields of the data set. In an embodiments, these dedicated fields include an identification (ID) of each GPU requesting access to the shared resource and an ID of the last GPU to access the shared resource, as described in more detail below.

In a step 630, each GPU that is requesting access to the shared resource computes an acknowledgement value based on the data read from all the dedicated fields of the data set. In an embodiment, the acknowledgement value is computed based on (i) the ID of each GPU requesting access to the shared resource, (ii) the last GPU to access the shared resource, and (iii) and the ID of the first GPU. The acknowledgement value may be computed using hardware, software, firmware, or a combination thereof. In an embodiment, the acknowledgement value is computed using a one-bit adder, as described in more detail below.

In a step 640, only one of the GPUs that is requesting access to the shared resource is granted access responsive to the computed acknowledgement value(s). For example, if a first GPU computes an acknowledgement value that is non-zero, the first GPU accesses the shared resource; however, if the first GPU computes an acknowledgement value that is zero, the first GPU is denied access to the shared resource. In this example, method 600 is such that only one GPU in the multi-GPU environment will compute an acknowledgement value that is non-zero. As a result, only one GPU in the multi-GPU environment will be granted access to the shared resource.

In a step 650, the dedicated fields are cleared to unlock the shared resource.

In an embodiment, method 600 is implemented by using a data structure that includes a double-word (DW) for a shared resource (e.g., semaphore) and a DW for each pair of GPUs in a multi-GPU environment. The DW for each pair of GPUs indicates a request for the shared resource DW (GPUx Req) and indicates which of the pair was the last to request access to the shared DW (Last GPU Req).

This embodiment is easily expandable to several GPUs. Additional pairs of GPUs can be incorporated into the multi-GPU environment by adding additional DWs to the data structure. Each additional DW will include a new byte field called Last GPU Pair Req field to support hierarchical arbitration.

In an embodiment, method 600 is implemented in hardware. In this embodiment, a one-bit adder is used to compute an acknowledgement value. Such a hardware implementation does not require significant chip area. For example, in one embodiment, only one additional wire is needed to implement this mechanism in a two-GPU environment compared to a single GPU environment.

For illustrative purposes, and not limitation, method 600 is described below in terms of a two-GPU environment, a four-GPU environment, and an eight-GPU environment. In this description, the shared resource is a semaphore. It is to be appreciated, however, that method 600 may be implemented to granted access to other types of shared resources. For example, method 600 may be implemented as a pure mutex mechanism.

B. An Example Mechanism Involving Two GPUs

In an embodiment, the request/acknowledgement mechanism of FIG. 6 is implemented in an environment that includes two GPUs. In this embodiment, the request/acknowledgement mechanism of FIG. 6 implements the decision tree shown in Table 1.

TABLE 1

|  | Thread A | Thread B |
|---|---|---|
| Initial | Boolean req0 = false; int LastGPUReqID = 0; | Boolean req1 = false; int LastGPUReqID = 0; |
| Before critical section | Req0 = true; LastGPUReqID = 0; while(Req1 && LastGPUReqID = 0) { } | Req1 = true; LastGPUReqID = 1; while(Req0 && LastGPUReqID = 1) { } |
| During critical section | cs ownership | cs ownership |
| After critical section | Req0 = false; | Req1 = false; |

Figure 7:
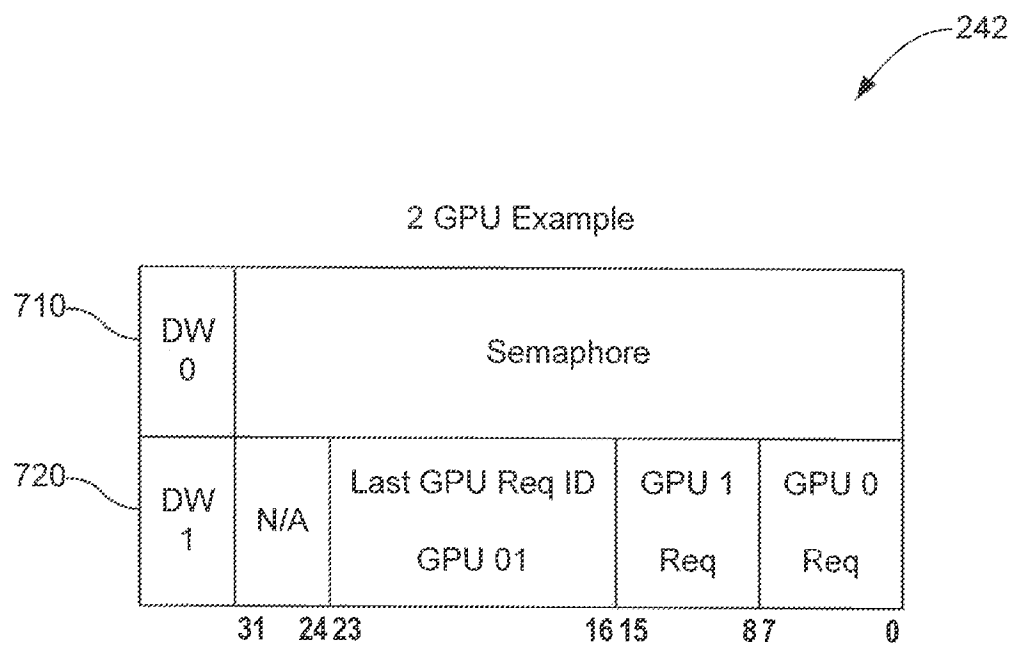

As mentioned above, method 600 is implemented by writing and reading from a data set, such as data set 242 of FIG. 2. FIG. 7 illustrates an embodiment in which data set 242 is organized into two double words—DW0 710 and DW1 720. DW0 710 comprises a semaphore, such as a 32-bit semaphore. DW1 720 includes three fields—a Last GPU Req ID, a GPU 1 Req, and a GPU 0 Req. Each of these fields is described below.

The Last GPU Req ID field corresponds to the ID of the last GPU to request access the semaphore. This field may be written to and read from by both GPU 1 and GPU 0. In an embodiment, the last GPU Req ID field includes bits 16 through 23 of DW1 720.

The GPU 1 Req field indicates whether GPU 1 is requesting access to the semaphore. This field may be written to by GPU 1 and may be read from by both GPU 1 and GPU 0. In other words, the GPU 1 Req field is a portion of DW1 that is dedicated to GPU 1. In an embodiment, the GPU 1 Req field includes bits 8 through 15 of DW1.

The GPU 0 Req field indicates whether GPU 0 is requesting access to the semaphore. This field may be written to by GPU 0 and may be read from by both GPU 1 and GPU 0. In other words, the GPU 0 Req field is a portion of DW1 that is dedicated to GPU 0. In an embodiment, the GPU 0 Req field includes bits 0 through 7 of DW1.

Figure 8:
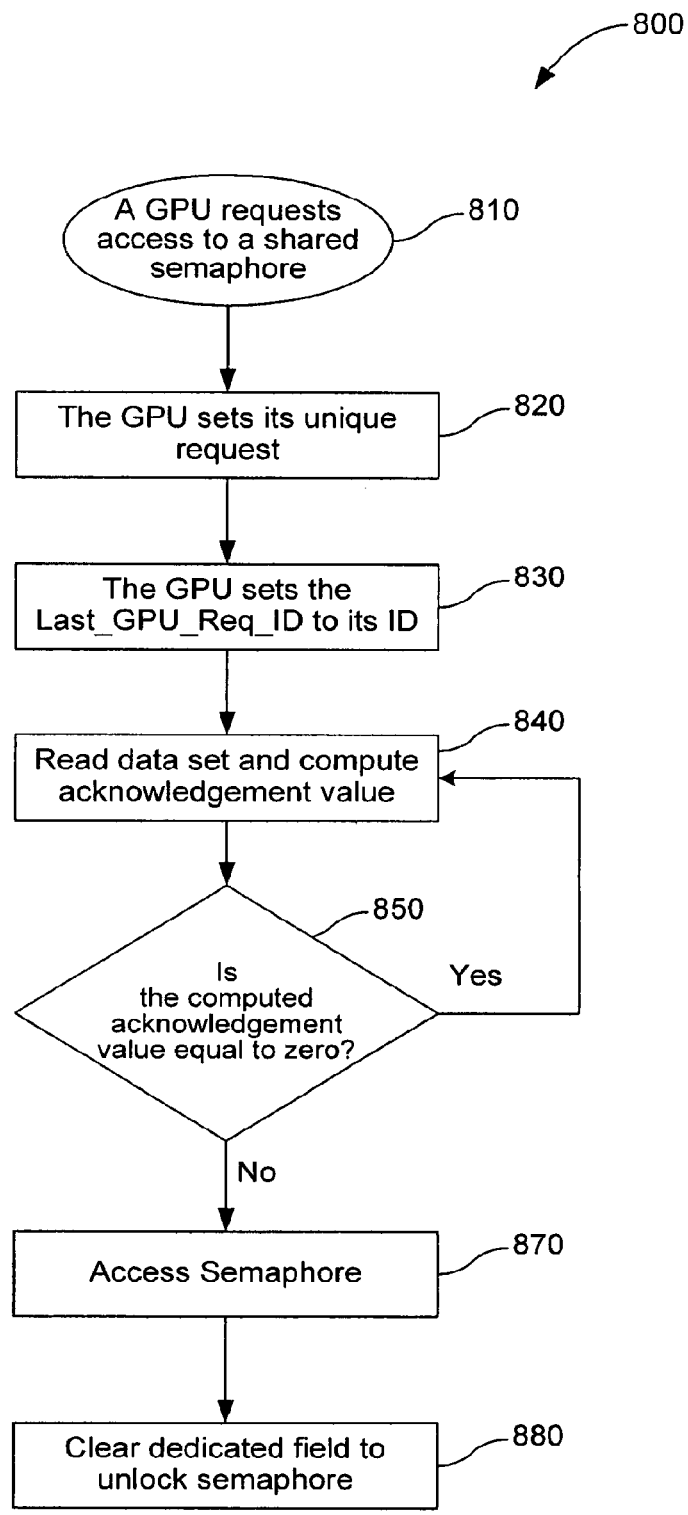
FIG. 8 depicts an example sequence of operations that a GPU follows to determine whether it may access a semaphore in accordance with an embodiment of the present invention.

Based on the data written to and read from the data structure illustrated in FIG. 7, GPU 0 and GPU 1 respectively determine whether they may access the semaphore. FIG. 8 depicts a flowchart 800 illustrating a sequence of operations that each GPU follows to determine whether it may access the semaphore. Flowchart 800 begins at a step 810 in which a GPU in the two-GPU environment requests access to the semaphore. For example, GPU 0, GPU 1, or both GPU 0 and GPU 1 may request access to the semaphore.

In a step 820, the GPU requesting access to the semaphore sets its unique request ID in the corresponding field in the data structure shown in FIG. 7. If GPU 0 requests access to the semaphore, then GPU 0 sets a bit in the GPU 0 Req field, for example, by writing a 1 to the GPU 0 Req field. In an embodiment, GPU 0 sets bit zero of DW1. If GPU 1 requests access to the semaphore, then GPU 1 sets a bit in the GPU 1 Req field, for example, by writing a 1 to the GPU 1 Req field. In an embodiment, GPU 1 sets bit eight of DW1.

In a step 830, the GPU requesting access to the semaphore sets the Last GPU Req field to its ID. If GPU 0 is the last to request access to the semaphore, then GPU 0 writes a zero to the Last GPU Req field. If GPU 1 is the last to request access to the semaphore, then GPU 1 writes a one to the Last GPU Req field.

In a step 840, the GPU requesting access to the semaphore reads data from the data set. For example, the requesting GPU reads the data from the Last GPU Req field, the GPU 1 Req field, and the GPU 0 Req field. Based on this data, the requesting GPU computes an acknowledgement value. In an embodiment, the acknowledgement value is computed in accordance with the following equation:

$$ack = GPU0\_Req + GPU1\_Req + Last\_GPU\_Req + GPU\text{'s ID} \quad (\text{Eq. 1})$$

wherein ack represents the acknowledgement value, GPU0_Req represents the value in the GPU 0 Req field, GPU1_Req represents the value in the GPU 1 Req field, Last_GPU_Req represents the value in the Last GPU Req field, and GPU's ID represents the value of the GPU requesting access to the semaphore. For example, suppose GPU 0 and GPU 1 each request access to the semaphore and GPU 1 was the last GPU to request access to the semaphore. Based on this data, GPU 0 computes an acknowledgement value as follows:

$$ack(GPU\ 0) = 1+1+1+0 = 3 (\text{mod } 2) = 1$$

Similarly, GPU 1 computes an acknowledgement value as follows:

$$ack(GPU\ 1) = 1+1+1+1 = 4 (\text{mod } 2) = 0$$

In a step 850, the GPU requesting access to the semaphore determines whether the acknowledgement value that it computed is equal to zero. If it is zero, then that GPU re-executes step 840. From the example above, GPU 1 re-executes step 840 because the acknowledgement value that it computed was equal to zero.

If however, the acknowledgement value is not equal to zero, then that GPU can access the semaphore as indicated in a step 870. From the example above, GPU 0 would be able to access the semaphore because the acknowledgement value that it computed was equal to one. If that semaphore's value is zero, the GPU must release the "lock" on the semaphore so a signal can occur. This is considered a "Failed Wait Semaphore." The semaphore is left unchanged, the GPU's GPUx_Req field is cleared on the write back, and Last_GPUx_Req_ID is unchanged. This allows the other GPU to have its turn, since the failed GPU removed its Req.

In a step 880, the dedicated fields are cleared to unlock the semaphore.

Figure 9:
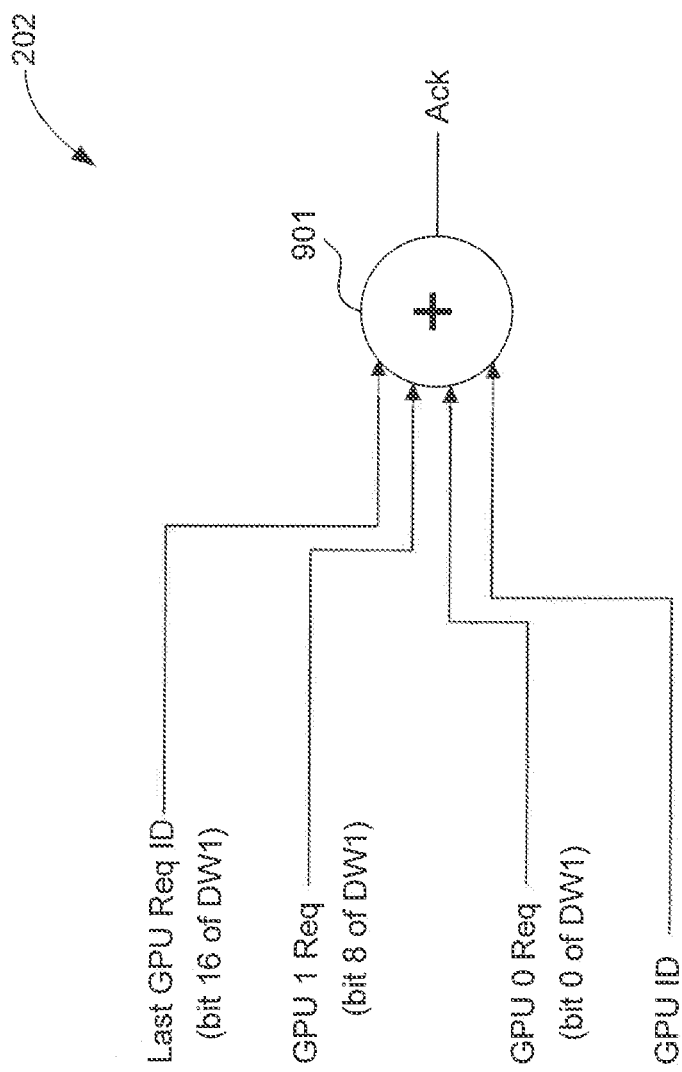
FIG. 9 depicts an example mechanism for summing fields of the data structure of FIG. 5 to obtain a value that indicates whether a GPU in a two-GPU environment may have access to a shared resource.

The computation of the acknowledgement value of Eq. 1 may be implemented by hardware, software, firmware, or a combination thereof. FIG. 9 depicts an embodiment in which the computation of Eq. 1 is implemented by a one-bit adder 901 included in logic A 202 of GPU A 108 or logic B 222 of GPU B 110. In this embodiment, the input to one-bit adder 901 includes one bit from the Last GPU Req field (such as bit 16 of DW1), one bit from the GPU 1 Req field (such as bit 8 of DW1), one bit from the GPU 0 Req field (such as bit 0 of DW1), and the ID of the GPU that requested access to the semaphore.

As mentioned above, method 600 may be implemented in a pure mutex situation. In such an embodiment, the semaphore DW is not required in the data structure of FIG. 7.

C. An Example Mechanism Involving Four GPUs

In an embodiment, the request/acknowledgement mechanism of FIG. 6 is implemented in an environment that includes four GPUs. In this embodiment, the request/acknowledgement mechanism of FIG. 6 implements the decision tree collectively shown in Tables 2A and 2B.

TABLE 2A

|  | Thread A | Thread B |
|---|---|---|
| Initial | Boolean req 0 =false; int LastGPUReqID = 0; | Boolean req 0 =false; int LastGPUReqID = 0; |
| Before critical section | Req0 = true; LastGPUReqID = 0; while((Req1 && LastGPUReqID = 0) \|\| | Req1 = true; LastGPUReqID = 1; while((Req0 && LastGPUReqID = 1) \|\| |

TABLE 2A-continued

|  | Thread A | Thread B |
|---|---|---|
| During critical section | ((Req2 \|\| Req3) && LastGPUReqIDPair= Pair01)) { } cs ownership | ((Req2 \|\| Req3) && LastGPUReqIDPair= Pair01)) { } cs ownership |
| After critical section | Req0 = false; | Req1 = false; |

TABLE 2B

|  | Thread C | Thread D |
|---|---|---|
| Initial | Boolean req 0 =false; int LastGPUReqID = 0; | Boolean req 0 =false; int LastGPUReqID = 0; |
| Before critical section | Req2 = true; LastGPUReqID = 2; while((Req3 && LastGPUReqID = 2) \|\| ((Req0 \|\| Req1) && LastGPUReqIDPair= Pair23)) { } | Req3 = true; LastGPUReqID = 3; while((Req2 && LastGPUReqID = 3) \|\| ((Req0 \|\| Req1) && LastGPUReqIDPair= Pair23)) { } |
| During critical section | cs ownership | cs ownership |
| After critical section | Req2 = false; | Req3 = false; |

Referring to FIG. 10, in a four GPU embodiment, data set 242 is organized into three double words—DW0 1010, DW1 1020, and DW2 1030. DW1 1010 comprises a semaphore, such as a 32-bit semaphore. DW1 1020 and DW2 1030 include byte fields to support hierarchical arbitration, DW1 1020 and DW2 1030 are described below.

DW1 1020 includes four fields—a Last GPU Req ID of GPUs 0123 field, a Last GPU Req ID of GPUs 01 field, a GPU 1 Req field, and a GPU 0 Req field. The Last GPU Req ID of GPUs 0123 field indicates whether GPU 0, GPU 1, GPU 2, or GPU 3 was the last GPU to request access to the semaphore. This field may be written to and read from by all four GPUs in the four-GPU environment. In an embodiment, the Last GPU ID of GPUs 0123 includes bits 24 through 31 of DW1 1020.

The Last GPU Req ID of GPUs 01 field indicates whether GPU 0 or GPU 1 was the last GPU to request access to the semaphore. This field may be written to by both GPU 0 and GPU 1, and may be read from by all four GPUs in the four-GPU environment. In an embodiment, the Last GPU Req ID of GPUs 01 includes bits 16 through 23 of DW1 1020.

The GPU 1 Req field indicates whether GPU 1 is requesting access to the semaphore. This field may be written to by GPU 1 and may be read from by all four GPUs in the four-GPU environment. In other words, the GPU 1 Req field is a portion of DW1 that is dedicated to GPU 1. In an embodiment, the GPU 1 Req field includes bits 8 through 15 of DW1 1020.

The GPU 0 Req field indicates whether GPU 0 is requesting access to the semaphore. This field may be written to by GPU 0 and may be read from by all four GPUs in the four-GPU environment. In other words, the GPU 0 Req field is a portion of DW1 that is dedicated to GPU 0. In an embodiment, the GPU 0 Req field includes bits 0 through 7 of DW1 1020.

DW2 1030 includes three fields—a Last GPU Req ID of GPUs 23 field, a GPU 3 Req field, and a GPU 2 Req field. The Last GPU Req ID of GPUs 23 field indicates whether GPU 2 or GPU 3 was the last GPU to request access to the semaphore. This field may be written to by both GPU 2 and GPU 3, and may be read from by all four GPUs in the four-GPU environment. In an embodiment, the Last GPU ID of GPUs 23 includes bits 16 through 23 of DW2 1030.

The GPU 3 Req field indicates whether GPU 3 is requesting access to the semaphore. This field may be written to by GPU 3 and may be read from by all four GPUs in the four-GPU environment. In other words, the GPU 3 Req field is a portion of DW2 that is dedicated to GPU 3. In an embodiment, the GPU 3 Req field includes bits 8 through 15 of DW2 1030.

The GPU 2 Req field indicates whether GPU 2 is requesting access to the semaphore. This field may be written to by GPU 2 and may be read from by all four GPUs in the four-GPU environment. In other words, the GPU 2 Req field is a portion of DW2 that is dedicated to GPU 2. In an embodiment, the GPU 2 Req field includes bits 0 through 7 of DW2 1030.

Figure 11:
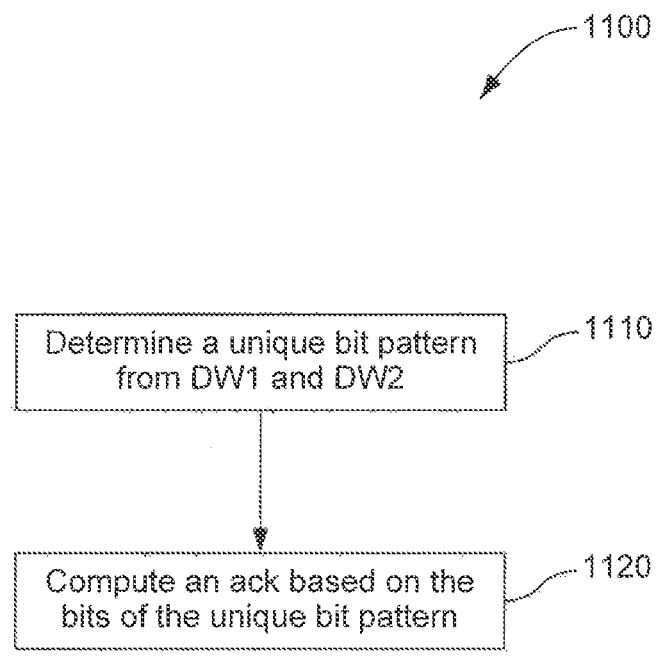
FIG. 11 depicts a flowchart illustrating an example method for computing an acknowledgement value in accordance with an embodiment of the present invention.

In a similar manner to that described above with respect to FIG. 8, the fields of the data structure of FIG. 10 are set in response to a GPU requesting access to the semaphore. Based on the data read from the data set, each individual GPU is configured to compute an acknowledgement value ("ack"). FIG. 11 depicts a flowchart illustrating an example method 1100 for computing the ack.

In a step 1110, a requesting GPU generates a unique bit pattern (denoted "A") based on (1) a concatenation of bits read from DW1 and DW2 and (2) an ID corresponding to the requesting GPU. With respect to (1), bits 16, 8, and 0 of DW2 1030 are concatenated with bits 24, 16, 8, and 0 of DW1 1020. With respect to (2), the ID corresponding to the requesting GPU is determined from a four location by seven-bit wide look-up table, as illustrated in Table 3. The computation of the unique bit pattern A is summarized by the following equation:

$$A = DW2[16,8,0] \| DW1[24,16,8,0] \text{ AND Requesting GPU's ID}; \quad \text{(Eq. 2)}$$

wherein DW2[16,8,0] represents the concatenation of bits 16, 8, and 0 of DW2 1030; DW1[24,16,8,0] represents the concatenation of bits 24, 16, 8, and 0 of DW1 1020; and Requesting GPU's ID is the seven-bit ID of the requesting GPU as determined from the look-up table illustrated in Table 3.

TABLE 3

| GPU0 | 0111110 |
|---|---|
| GPU1 | 0111101 |
| GPU2 | 1101011 |
| GPU3 | 1011011 |

In a step 1120, the requesting GPU computes the ack from bits contained in the unique bit pattern A. In particular, the ack is computed in accordance with the following equation:

$$ack = A[6] + (A[5] \text{ OR } A[4]) + A[3] + A[2] + (A[1] \text{ OR } A[0]) + 1; \quad \text{(Eq. 3)}$$

wherein A[x] represents the x-th bit of the unique bit pattern A. The ack formula of Eq. 3 is used by all GPUs.

The computation of the unique bit pattern A of Eq. 2 and the ack of Eq. 3 may be implemented by hardware, software, firmware, or a combination thereof. FIG. 12A depicts an embodiment in which the computation of the unique bit pattern A is performed by an ADD gate 1207 included in logic of the GPUs in the four-GPU environment. In this embodiment, the input to ADD gate 1207 includes (i) the concatenation of DW2[16, 8, 0] and DW1[24, 16, 8, 0], and (ii) the unique ID of each requesting GPU that may be obtained, for example, from a look-up table. Alternatively, the unique ID for each GPU may be obtained through appropriate use of a multiplexer or some other type of circuit, as would be apparent to a person skilled in the relevant art(s).

FIG. 12B depicts an embodiment in which the computation of the ack is performed by a circuit 1200 included in logic of each requesting GPU. As illustrated in FIG. 12B, circuit 1200 includes a first OR-gate 1201, a second OR-gate 1203, and a one-bit adder 1205. Input to first OR-gate 1201 comprises bit 5 and bit 4 from the unique bit pattern A computed by each requesting GPU. Input to second OR-gate 1203 comprises bit 1 and bit 0 from the unique bit pattern A computed by each requesting GPU. One-bit adder 1205 computes the ack based on the following input: (i) bit 6, bit 3, and bit 2 from the unique bit pattern A; (ii) the output of first OR-gate 1201; (iii) the output of second OR-gate 1203; and (iv) a bit that is a logical one.

An example is now described to illustrate the computation of the ack in a four-GPU embodiment. For this example, suppose that GPU 0, GPU 2, and GPU 3 each request access to the semaphore and that GPU 1 does not request access to the semaphore. Suppose further that: (1) between GPU 0 and GPU 1, GPU 0 was the last to request access to the semaphore; (2) between GPU 2 and GPU 3, GPU 3 was the last to request access to the semaphore; and (3) between all the GPUs, GPU 0 was the last to request access to the semaphore. This information is summarized in Table 4A.

TABLE 4A

| Field in Data Set | Status | Bit Pattern |
| --- | --- | --- |
| GPU 0 Req | Requesting access | 1 |
| GPU 1 Req | Not requesting access | 0 |
| GPU 2 Req | Requesting access | 1 |
| GPU 3 Req | Requesting access | 1 |
| Last GPU Req ID of GPU 01 | GPU 0 was last to request | 0111110 |
| Last GPU Req ID of 23 | GPU 3 was last to request | 1011011 |
| Last GPU Req ID of 0123 | GPU 0 was last to request | 0111110 |

Each GPU requesting access to the semaphore (e.g., GPU 0, GPU 2, and GPU 3) reads data from data set 242 to determine whether that GPU may access the semaphore. First, each GPU computes the concatenation of DW2[16, 8, 0] and DW1[24, 16, 8, 0]. From the bit patterns shown in Table 4A, this concatenation is equal to 1110001, as illustrated in the first row of Table 4B. Second, each requesting GPU computes the unique bit pattern A in accordance with Eq. 2 by ANDing the concatenation of DW2[16, 8, 0] and DW1[24, 16, 8, 0] with its unique GPU ID. The unique bit pattern A that each requesting GPU computes is illustrated in the third row of Table 4B. Then, each requesting GPU computes an ack in accordance with Eq. 3. As illustrated in the fourth row of Table 4B, only GPU 2 computes an ack that is non-zero. Thus, only GPU 2 is granted access to the semaphore, even though GPU 0 and GPU 3 also requested access.

TABLE 4B

| | GPU 0 | GPU 1 | GPU 2 | GPU 3 |
| --- | --- | --- | --- | --- |
| DW2[16, 8, 0] ‖ DW1[24, 16, 8, 0] | 1110001 | — | 1110001 | 1110001 |
| GPU ID | 0111110 | — | 1101011 | 1011011 |
| A | 0110000 | — | 1100001 | 1010001 |
| ack | 0 | — | 1 | 0 |

D. Example Mechanisms Involving More than Four GPUs

The request/acknowledgement mechanism described above scales to an unlimited number of requestors. As mentioned above, additional pairs of GPUs may be incorporated into the multi-GPU environment by adding additional DWs to data set 242. For example, FIG. 13 illustrates an example configuration of data set 242 for an embodiment in eight GPUs use the request/acknowledgement mechanism described above to receive controlled access to a semaphore.

IV. Example Computer Implementation

Embodiments of the present invention (such as GPU A 108, GPU B 110, logic A 202, logic B 222, method 400 of FIG. 4, method 600 of FIG. 6, method 800 of FIG. 8, method 1100 of FIG. 11, or any part(s) or function(s) thereof) may be implemented using hardware, software or a combination thereof and may be implemented in one or more computer systems or other processing systems. Useful machines for performing the operation of the present invention include general purpose digital computers or similar devices.

In fact, in one embodiment, the invention is directed toward one or more computer systems capable of carrying out the functionality described herein. An example of a computer system 1400 is shown in FIG. 14.

The computer system 1400 includes one or more processors, such as processor 1404. Processor 1404 may be a general purpose processor. Processor 1404 is connected to a communication infrastructure 1406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Figure 1:
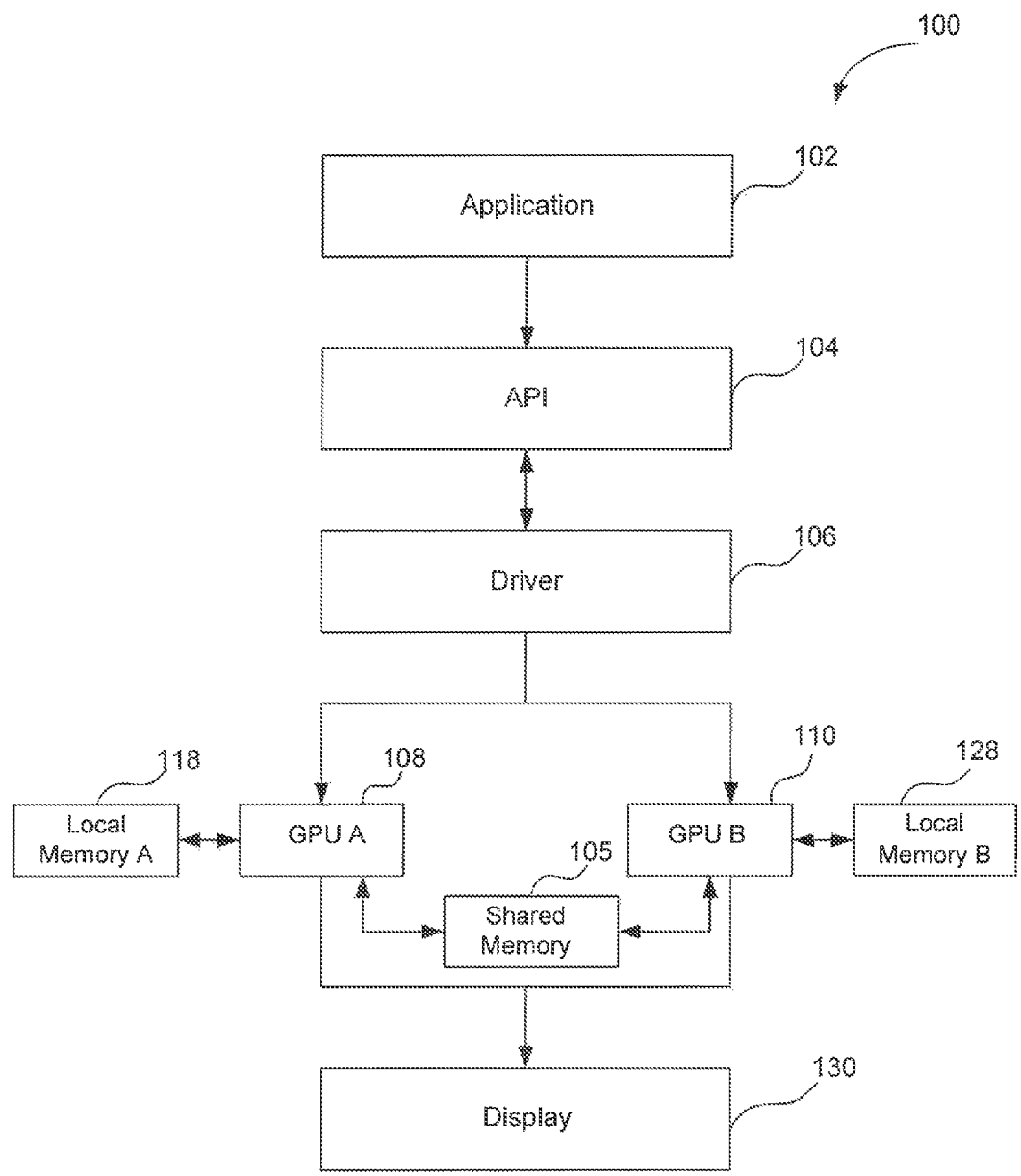
FIG. 1 depicts a block diagram of an example system that includes a plurality of GPUs.

Computer system 1400 can include a graphics processing system 1402 which performs graphics processing tasks for rendering images to an associated display 1430. Graphics processing system 1402 may include the graphics hardware elements described above in reference to FIGS. 1, 2, and 5, such as GPU A 108 and GPU B 110, although the invention is not so limited. In an embodiment, graphics processing system 1402 is configured to perform features of the present invention, such as the multi-summed semaphore mechanism and the request/acknowledgement mechanism described above. Graphics processing system 1402 may perform these steps under the direction of computer programs being executed by processor 1404 and/or under the direction of computer programs being executed by one or more graphics processors within graphics processing system 1402.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative embodiments, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424, and an audio interface 1432 connected to speakers 1434. Communications interface 1424 allows software and data to be transferred between computer system 1400 and external devices. Examples of communications interface 1424 may include a modem, a network interface (such as an Ethernet card), a communications port, a Personal Computer Memory Card International Association (PCM-CIA) slot and card, etc. Software and data transferred via communications interface 1424 are in the form of signals which may be electronic, electromagnetic, optical or other signals capable of being received by communications interface 1424. These signals are provided to communications interface 1424 via a communications path (e.g., channel) 1426. This channel 1426 carries signals and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1414, a hard disk installed in hard disk drive 1412, and signals. These computer program products provide software to computer system 1400. The invention is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present invention, as discussed herein. In particular, the computer programs, when executed, enable the processor 1404 to perform the features of the present invention. Accordingly, such computer programs represent controllers of the computer system 1400.

In an embodiment where the invention is implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

In addition to hardware implementations of GPU A 108 and GPU B 110, such GPUs may also be embodied in software disposed, for example, in a computer usable (e.g., readable) medium configured to store the software (e.g., a computer readable program code). The program code causes the enablement of embodiments of the present invention, including the following embodiments: (i) the functions of the systems and techniques disclosed herein (such as granting a GPU in a multi-GPU environment controlled access to a shared resource); (ii) the fabrication of the systems and techniques disclosed herein (such as the fabrication of GPU A 108 and GPU B 110); or (iii) a combination of the functions and fabrication of the systems and techniques disclosed herein. For example, this can be accomplished through the use of general programming languages (such as C or C++), hardware description languages (HDL) including Verilog HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method comprising:
    associating a first dedicated field of a data set to a first graphics processing unit (GPU) in a multi-GPU environment, wherein the first dedicated field is exclusively written to by the first GPU;
    associating a second dedicated field of the data set to a second GPU in the multi-GPU environment;
    associating a third field of the data set with a last GPU to request access to a shared resource, wherein the third field includes an ID of a last GPU of the first or second GPU to access the shared resource;
    writing data by the first GPU to the first dedicated field of the data set;
    storing the data set and the shared resource in a shared computer memory of the multi-GPU environment; and
    computing by the first GPU, a value based on data read from the first and second dedicated fields, and data read from the third field, the computed value being indicative of whether the first GPU can access the shared resource, wherein each of the first and second GPU includes logic facilitating independent access to the shared resource responsive to the computed value, the independent access being devoid of a single point of control.

2. The method of claim 1, wherein the writing data by the first GPU comprises:
    writing an identification (ID) of the first GPU.

3. The method of claim 1, wherein the data read comprises:
    at least one indicator bit corresponding to data written by the first GPU.

4. The method of claim 3, wherein the computing comprises:
    adding the ID of the last one of the first or second GPU to access the shared resource, the at least one indicator bit, and the ID of the first GPU.

5. The method of claim 1, wherein the writing comprises:
decrementing a value stored in a first semaphore corresponding to the first GPU.

6. The method of claim 1, wherein the data read comprises:
values stored in a first semaphore corresponding to the first GPU and a second semaphore corresponding to the second GPU.

7. The method of claim 6, wherein the computing comprises:
summing the values.

8. A computer-readable storage device having instructions stored thereon, execution of which, by a computing device, causes the computing device to perform operations comprising:
associating a first dedicated field of a data set to a first graphics processing unit (GPU) in a multi-GPU environment, wherein the first dedicated field is exclusively written to by the first GPU;
associating a second dedicated field of the data set to a second GPU in the multi-GPU environment;
associating a third field of the data set with a last GPU to request access to a shared resource, wherein the third field includes an ID of a last GPU of the first or second GPU to access the shared resource;
writing data by the first GPU to the first dedicated field of the data set;
storing the data set and the shared resource in a shared computer memory of the multi-GPU environment; and
computing by the first GPU a value based on data read from the first and the second dedicated fields, and data read from the third field, the computed value being indicative of whether the first GPU can access the shared resource,
wherein each of the first and second GPU includes logic facilitating independent access to the shared resource responsive to the computed value, the independent access being devoid of a single point of control.

9. The computer-readable storage device of claim 8, wherein the writing data by the first GPU comprises:
writing an identification (ID) of the first GPU.

10. The computer-readable storage device of claim 8, wherein the data read comprises:
at least one indicator bit corresponding to data written by the first GPU.

11. The computer-readable storage device of claim 10, wherein the computing comprises:
adding the ID of the last one of the first or second GPU to access the shared resource, the at least one indicator bit, and the ID of the first GPU.

12. The computer-readable storage device of claim 8, wherein the writing data comprises:
decrementing a value stored in a first semaphore corresponding to the first GPU.

13. The computer-readable storage device of claim 8, wherein the data read comprises:
values stored in a first semaphore corresponding to the first GPU and a second semaphore corresponding to the second GPU.

14. The computer-readable storage device of claim 13, wherein the computing comprises:
summing the values.

15. The computer-readable storage device of claim 8, wherein the first GPU is embodied in hardware description language software.

16. The computer-readable storage device of claim 15, wherein the first GPU is embodied in one of Verilog hardware description language software and VHDL hardware description language software.

17. A system comprising:
a first dedicated field of a data set associated with a first application-specific integrated circuit (ASIC) in a multi-GPU environment, wherein the first dedicated field is exclusively written to by the first ASIC;
a second dedicated field of the data set associated with a second ASIC in the multi-GPU environment;
a third field of the data set associated with a last ASIC to request access to a shared resource, wherein the third field includes an ID of a last ASIC of the first or second ASIC to access the shared resource;
a shared computer memory of the multi-GPU environment that stores the shared resource and the data set partitioned into fields;
the first ASIC configured to write data to the first dedicated field of the data set and compute a first value based on data read from the first and second dedicated fields, and data read from the third field, the computed first value being indicative of whether the first ASIC accesses the shared resource; and
the second ASIC configured to write data to the second dedicated field of the data set and compute a second value based on data read from the first and second dedicated fields,
wherein each of the first and second ASICs includes logic facilitating independent access to the shared resource responsive to the computed first and second values, respectively, the independent access being devoid of a single point of control.

18. The system of claim 17, wherein the shared resource comprises a semaphore.

19. The system of claim 17, wherein the first ASIC comprises a first graphics processing unit (GPU).

20. The system of claim 19, wherein the second ASIC comprises a second GPU.

21. The system of claim 20, wherein the fields of the data set comprise a first indicator bit indicating whether the first GPU issued an access request, and a second indicator bit indicating whether the second GPU issued an access request.

22. The system of claim 21, wherein the first ASIC comprises a one-bit adder that computes the first value by adding an ID bit corresponding to a last GPU of the first or second GPUs to request access to the shared resource, the first indicator bit, the second indicator bit, and an ID bit corresponding to the first GPU.

23. The system of claim 21, wherein the second ASIC comprises a one-bit adder that computes the second value by adding an ID bit corresponding to a last GPU of the first or second GPUs to request access to the shared resource, the first indicator bit, the second indicator bit, and an ID corresponding to the second GPU.

24. A system comprising:
a first dedicated field of a data set associated with a first application-specific integrated circuit (ASIC) in a plurality of ASIC environment, wherein the first dedicated field is exclusively written to by the first ASIC;
a second dedicated field of the data set associated with a second ASIC in the plurality of ASIC environment;
a third field of the data set associated with a last ASIC to request access to a shared resource, wherein the third field includes an ID of the a last one of the first or second ASIC to access the shared resource;
a shared memory of the plurality of ASIC environment that stores the shared resource and the data set partitioned into fields;
the first ASIC configured to write data to the first dedicated field of the data set; and the first ASIC configured to compute a value based on data read from the first and second dedicated fields, and data read from the third field, the computed value being indicative of whether the first ASIC accesses the shared resource, wherein each of the first and second ASICs includes logic facilitating independent access to the shared resource responsive to the computed value, the independent access being devoid of a single point of control.

* * * * *

UNITED STATES PATENT AND TRADEMARK OFFICE
CERTIFICATE OF CORRECTION

| | | |
|---|---|---|
| PATENT NO. | : 8,576,236 B2 | Page 1 of 1 |
| APPLICATION NO. | : 13/088285 | |
| DATED | : November 5, 2013 | |
| INVENTOR(S) | : Andre et al. | |

It is certified that error appears in the above-identified patent and that said Letters Patent is hereby corrected as shown below:

In the Claims

Column 22

Claim 24, Line 64 replace "stores a the" with --stores the--.

Signed and Sealed this
Twenty-fourth Day of June, 2014

Michelle K. Lee
*Deputy Director of the United States Patent and Trademark Office*